(12) United States Patent
Miyahara et al.

(10) Patent No.: US 12,283,171 B2
(45) Date of Patent: Apr. 22, 2025

(54) NOTIFICATION CONTROLLER AND NOTIFICATION CONTROL METHOD

(71) Applicant: Mitsubishi Electric Corporation, Tokyo (JP)

(72) Inventors: Tadashi Miyahara, Tokyo (JP); Mitsuo Shimotani, Tokyo (JP); Keisaku Fukuda, Tokyo (JP); Kuniyo Ieda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/271,161

(22) PCT Filed: Apr. 6, 2021

(86) PCT No.: PCT/JP2021/014603
§ 371 (c)(1),
(2) Date: Jul. 6, 2023

(87) PCT Pub. No.: WO2022/215158
PCT Pub. Date: Oct. 13, 2022

(65) Prior Publication Data
US 2024/0054877 A1     Feb. 15, 2024

(51) Int. Cl.
*G08B 21/02*     (2006.01)
*B60W 40/08*     (2012.01)
(Continued)

(52) U.S. Cl.
CPC ......... *G08B 21/0208* (2013.01); *B60W 40/08* (2013.01); *B60W 50/14* (2013.01);
(Continued)

(58) Field of Classification Search
None
See application file for complete search history.

(56) References Cited

U.S. PATENT DOCUMENTS 9,290,174 B1 *  3/2016  Zagorski ............... B60W 30/18
9,317,983 B2 *  4/2016  Ricci ................. G08G 1/096775
(Continued)

FOREIGN PATENT DOCUMENTS

CN    110758241 A    2/2020
JP    10-55496 A     2/1998
(Continued)

OTHER PUBLICATIONS

Japanese Office Action for Japanese Application No. 2023-512544, dated Aug. 27, 2024, with English translation.
(Continued)

*Primary Examiner* — Muhammad Adnan
(74) *Attorney, Agent, or Firm* — Birch, Stewart, Kolasch & Birch, LLP

(57) ABSTRACT

The present disclosure is intended to notify an off-board passenger of a hazardous situation occurring around a target vehicle in the presence of an on-board passenger in the vehicle. A notification controller according to the present disclosure includes: an on-board passenger judgment unit, if at least one passenger in a target vehicle gets out of the vehicle to become an off-board passenger, the on-board passenger judgment unit judging whether there is a different passenger staying in the target vehicle; a hazard judgment unit that judges whether a hazardous situation is occurring around the target vehicle if there is an on-board passenger; and a notification control unit that makes radio communication with a communication terminal of the off-board passenger to make outward notification that is notification indicating the occurrence of the hazardous situation to the off-board passenger if the hazard judgment unit judges that the hazardous situation is occurring.

19 Claims, 31 Drawing Sheets

(51) Int. Cl.
  *B60W 50/14* (2020.01)
  *B60W 60/00* (2020.01)
  *G06V 40/18* (2022.01)
  *G08B 21/22* (2006.01)

(52) U.S. Cl.
  CPC ......... B60W 60/0016 (2020.02); G06V 40/18 (2022.01); G08B 21/22 (2013.01); *B60W 2540/225* (2020.02); *B60W 2540/229* (2020.02); *B60W 2540/26* (2013.01); *B60W 2556/45* (2020.02)

(56) References Cited

U.S. PATENT DOCUMENTS

| | | | | |
|---|---|---|---|---|
| 9,963,107 | B2* | 5/2018 | Murar | B60Q 1/32 |
| 10,814,744 | B2* | 10/2020 | Labombarda | G01P 15/18 |
| 10,976,173 | B2* | 4/2021 | Harish | G05D 1/0276 |
| 11,887,460 | B2* | 1/2024 | Roberts | G16H 40/67 |
| 12,030,489 | B2* | 7/2024 | Roberts | B60W 30/085 |
| 12,112,620 | B2* | 10/2024 | Saenz | G06V 20/625 |
| 2002/0163426 | A1* | 11/2002 | Moskowitz | B60R 99/00 340/988 |
| 2005/0040935 | A1* | 2/2005 | Ewert | B60Q 5/00 340/384.2 |
| 2007/0194944 | A1* | 8/2007 | Galera | F16P 3/14 340/686.6 |
| 2010/0019932 | A1* | 1/2010 | Goodwin | G08G 1/162 340/902 |
| 2010/0302022 | A1* | 12/2010 | Saban | B60N 2/267 340/459 |
| 2016/0090038 | A1* | 3/2016 | Briggs | B60Q 1/525 340/435 |
| 2017/0060130 | A1* | 3/2017 | Kim | H04W 4/80 |
| 2017/0154241 | A1* | 6/2017 | Shambik | G06V 20/58 |
| 2017/0232930 | A1* | 8/2017 | Murar | B60Q 5/005 340/5.61 |
| 2017/0324695 | A1* | 11/2017 | Fischer | H04L 51/224 |
| 2018/0029522 | A1* | 2/2018 | Gordon | B60Q 7/00 |
| 2019/0018425 | A1* | 1/2019 | Harish | G06F 3/147 |
| 2019/0143967 | A1* | 5/2019 | Kutila | B60W 60/0016 701/23 |
| 2019/0193590 | A1* | 6/2019 | Labombarda | G08B 21/22 |
| 2019/0248380 | A1* | 8/2019 | Tatourian | G05D 1/0061 |
| 2020/0104326 | A1* | 4/2020 | Ricci | H04W 12/088 |
| 2020/0133280 | A1* | 4/2020 | Seccamonte | B60W 60/0016 |
| 2020/0207358 | A1* | 7/2020 | Katz | G02B 27/0093 |
| 2020/0369297 | A1* | 11/2020 | Jeon | B60W 40/09 |
| 2022/0204016 | A1* | 6/2022 | Lerner | B60W 60/0059 |
| 2022/0305988 | A1* | 9/2022 | Xi | G08B 25/016 |
| 2024/0042926 | A1* | 2/2024 | Nojiri | B60W 30/12 |

FOREIGN PATENT DOCUMENTS

| | | |
|---|---|---|
| JP | 2001-219817 A | 8/2001 |
| JP | 2004-318226 A | 11/2004 |
| JP | 2005-227965 A | 8/2005 |
| JP | 2013-133010 A | 7/2013 |
| JP | 2014-85808 A | 5/2014 |
| JP | 2019-21002 A | 2/2019 |
| JP | 2020-144613 A | 9/2020 |

OTHER PUBLICATIONS

International Search Report, issued in PCT/JP2021/014603, PCT/ISA/210, dated Jul. 6, 2021.
Japanese Office Action for Japanese Application No. 2023-512544, dated May 7, 2024, with English translation.

* cited by examiner

FIG. 5

| HAZARDOUS FACTOR \ HAZARDOUS LEVEL | 1 | 2 | 3 | 4 | 5 |
|---|---|---|---|---|---|
| HUMAN | PASSERBY | GAZE AT TARGET VEHICLE AND HANG AROUND TARGET VEHICLE | LOOK INTO TARGET VEHICLE | HAVE HAZARDOUS ITEM | TOUCH TARGET VEHICLE |
| NON-TARGET VEHICLE | UNMANNED VEHICLE IS STOPPING | MANNED VEHICLE IS APPROACHING AND STOPPING | PASSENGER LOOKING INTO TARGET VEHICLE | SUSPICIOUS RADIO SIGNAL | TOUCH TARGET VEHICLE |
| ANIMAL | SMALL INSECT | SMALL ANIMAL | MIDDLE ANIMAL | MIDDLE FIERCE ANIMAL | LARGE FIERCE ANIMAL |
| ACCIDENT | RAIN | HEAVY SNOW | EARTHQUAKE OR FIRE | SUDDEN SWOLLENNESS | TYPHOON OR TWISTER |

F I G. 12

| RECOGNITION LEVEL | 1 | 2 | 3 | 4 |
|---|---|---|---|---|
| BEHAVIOR | TAKING A NAP | HAVING CONVERSATION OR OPERATING SMARTPHONE | LOOKING OUT OF VEHICLE | SEEING HAZARDOUS FACTOR |

FIG. 13

| RECOGNITION LEVEL \ HAZARDOUS LEVEL | 1 | 2 | 3 | 4 | 5 |
|---|---|---|---|---|---|
| 1 | OUTWARD SITUATION NOTIFICATION | OUTWARD SITUATION NOTIFICATION | OUTWARD SITUATION NOTIFICATION | OUTWARD WARNING NOTIFICATION | OUTWARD WARNING NOTIFICATION |
| 2 | NO NOTIFICATION | OUTWARD SITUATION NOTIFICATION | OUTWARD SITUATION NOTIFICATION | OUTWARD WARNING NOTIFICATION | OUTWARD WARNING NOTIFICATION |
| 3 | NO NOTIFICATION | OUTWARD SITUATION NOTIFICATION | OUTWARD SITUATION NOTIFICATION | OUTWARD SITUATION NOTIFICATION | OUTWARD WARNING NOTIFICATION |
| 4 | NO NOTIFICATION | OUTWARD SITUATION NOTIFICATION | OUTWARD SITUATION NOTIFICATION | OUTWARD SITUATION NOTIFICATION | OUTWARD WARNING NOTIFICATION |

FIG. 18

| RECOGNITION LEVEL \ HAZARDOUS LEVEL | 1 | 2 | 3 | 4 | 5 |
|---|---|---|---|---|---|
| 1 | OUTWARD SITUATION NOTIFICATION | OUTWARD SITUATION NOTIFICATION + INWARD SITUATION NOTIFICATION | OUTWARD SITUATION NOTIFICATION + INWARD SITUATION NOTIFICATION | OUTWARD WARNING NOTIFICATION + INWARD WARNING NOTIFICATION | OUTWARD WARNING NOTIFICATION + INWARD WARNING NOTIFICATION |
| 2 | NO NOTIFICATION | OUTWARD SITUATION NOTIFICATION | OUTWARD SITUATION NOTIFICATION + INWARD SITUATION NOTIFICATION | OUTWARD WARNING NOTIFICATION + INWARD WARNING NOTIFICATION | OUTWARD WARNING NOTIFICATION + INWARD WARNING NOTIFICATION |
| 3 | NO NOTIFICATION | OUTWARD SITUATION NOTIFICATION | OUTWARD SITUATION NOTIFICATION | OUTWARD SITUATION NOTIFICATION + INWARD SITUATION NOTIFICATION | OUTWARD WARNING NOTIFICATION + INWARD WARNING NOTIFICATION |
| 4 | NO NOTIFICATION | OUTWARD SITUATION NOTIFICATION | OUTWARD SITUATION NOTIFICATION | OUTWARD SITUATION NOTIFICATION + INWARD SITUATION NOTIFICATION | OUTWARD WARNING NOTIFICATION + INWARD WARNING NOTIFICATION |

F I G. 2 0
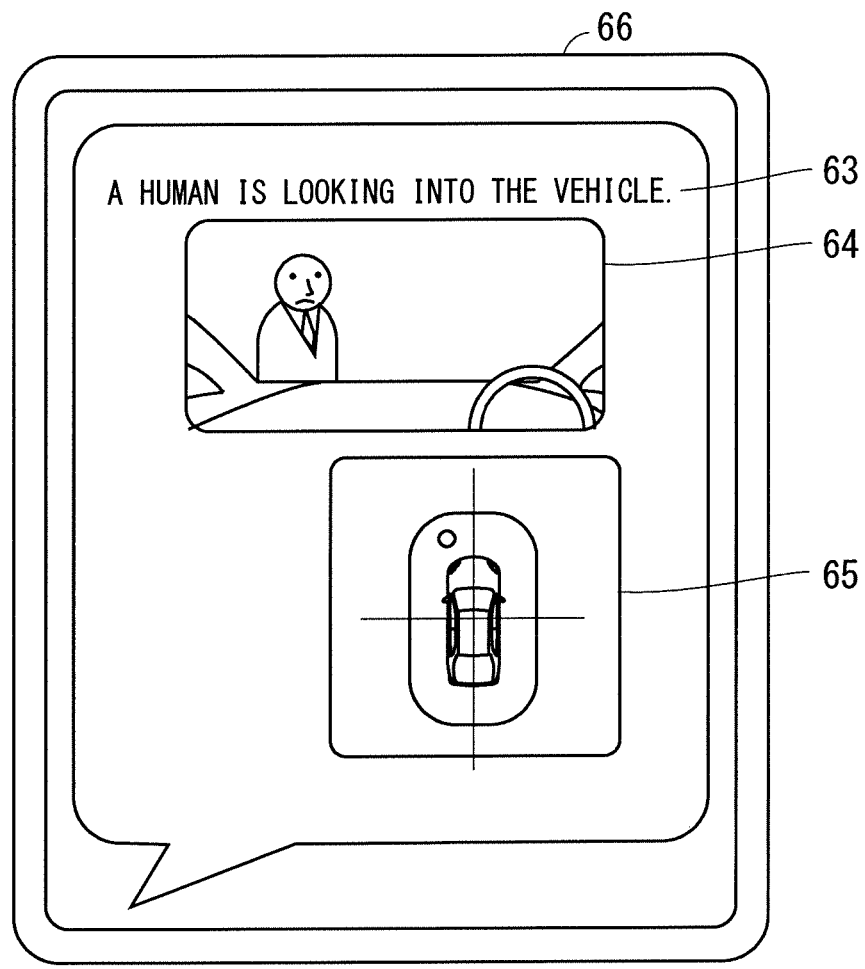

NOTIFICATION CONTROLLER AND NOTIFICATION CONTROL METHOD

TECHNICAL FIELD

The present disclosure relates to a technique of notifying a person involved in a vehicle of the occurrence of a hazard at the vehicle.

BACKGROUND ART

There exists a need to notify a person outside a vehicle such as an owner of the vehicle or a passenger temporarily away from the vehicle of information about a passenger in the vehicle or about safety of the vehicle.

In response to this, Patent Document 1 discloses a vehicle-mounted device that transmits safety information about a passenger moving in a vehicle to an information receiver outside the vehicle if the passenger encounters an accident. There is also a vehicle burglar warning device already realized that detects a situation where harm is about to be caused on a parked vehicle without a passenger and makes a report to the outside of the vehicle.

PRIOR ART DOCUMENTS

Patent Document(s)

Patent Document 1: Japanese Patent Application Laid-Open No. 2014-085808

SUMMARY

Problem to be Solved by the Invention

However, the above-described conventional technique does not give consideration to a case where some passenger has moved away from the vehicle while a different passenger is left in the vehicle. In the following, some passenger away from the vehicle will be called an "off-board passenger" and the passenger staying in the vehicle will be called an "on-board passenger" for distinction between these passengers. According to the conventional technique, if a hazard comes near the on-board passenger from the outside of the vehicle, such a situation cannot be notified to the off-board passenger. This causes a problem of failing to remove anxiety of the off-board passenger about safety of the on-board passenger.

The present disclosure has been made to solve the above-described problem, and is intended to notify an off-board passenger of a hazardous situation occurring around a target vehicle in the presence of an on-board passenger in the vehicle.

Means to Solve the Problem

A notification controller of the present disclosure includes: an on-board passenger judgment unit, if at least one passenger of two or more passengers in a target vehicle gets out of the vehicle to become an off-board passenger, the on-board passenger judgment unit judging whether there is a different passenger staying in the target vehicle; a hazard judgment unit that judges whether a hazardous situation is occurring around the target vehicle if there is an on-board passenger who is the different passenger staying in the target vehicle; and a notification control unit that makes radio communication with a communication terminal of the off-board passenger to make outward notification that is notification indicating the occurrence of the hazardous situation to the off-board passenger if the hazard judgment unit judges that the hazardous situation is occurring.

Effects of the Invention

The notification controller of the present disclosure makes it possible to notify the off-board passenger of the hazardous situation occurring around the target vehicle. These and other objects, features, aspects and advantages of the present disclosure will become more apparent from the following detailed description and the accompanying drawings.

BRIEF DESCRIPTION OF DRAWINGS

FIG. 5 shows examples of a hazardous level responsive to a hazardous factor;

FIG. 12 shows a relationship between the behavior of an on-board passenger and a recognition level;

FIG. 13 illustrates styles of outward notification responsive to a recognition level and a hazardous level;

FIG. 18 illustrates styles of outward notification and inward notification responsive to a recognition level and a hazardous level;

FIG. 20 shows an example of the inward notification;

DESCRIPTION OF EMBODIMENT(S)

A. First Embodiment

A-1. Configuration

Figure 1:
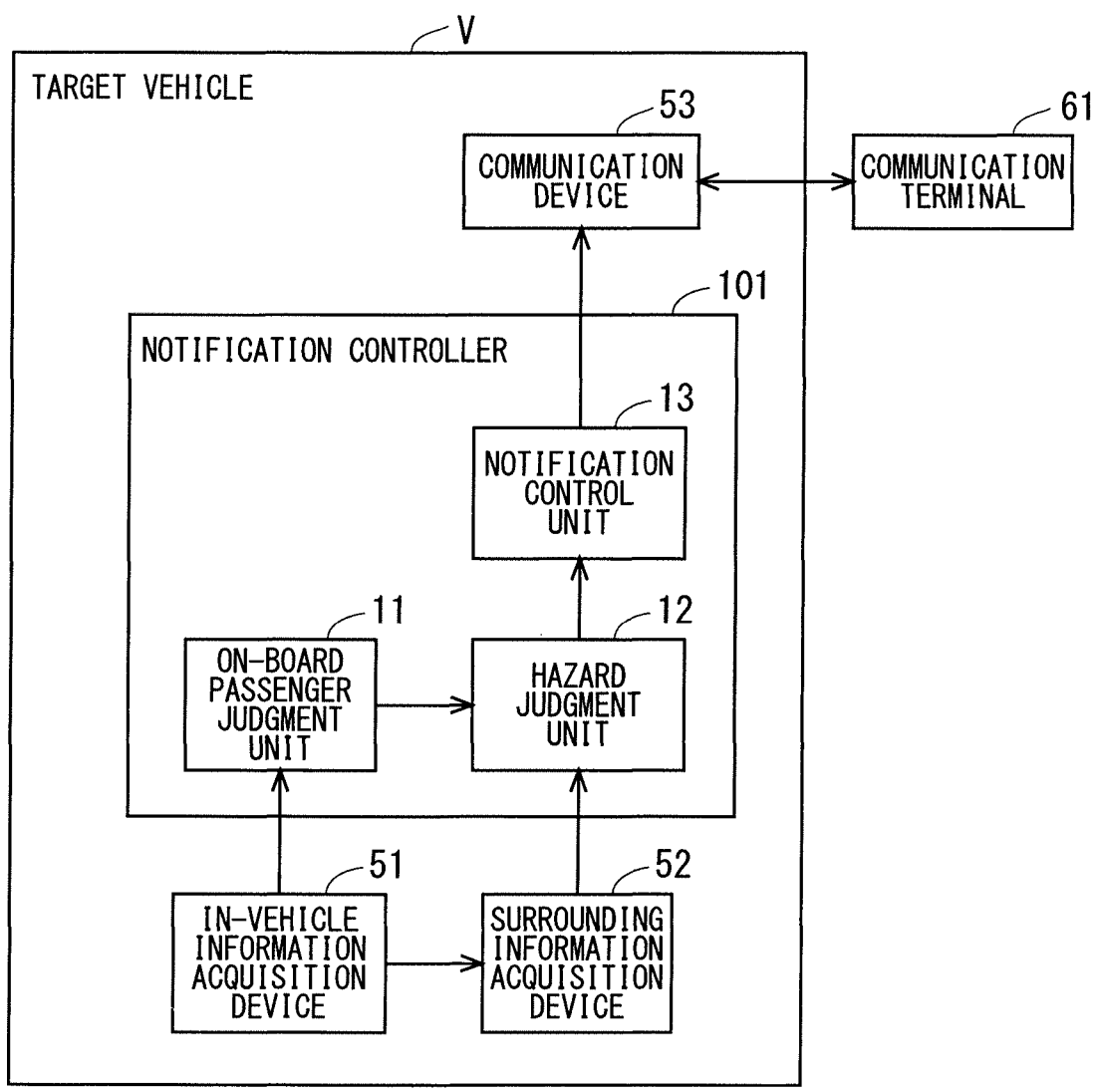
FIG. 1 is a block diagram showing the configuration of a notification controller according to a first embodiment.

FIG. 1 is a block diagram showing the configuration of a notification controller 101 according to a first embodiment. If the notification controller 101 detects that at least one passenger has moved away from a vehicle in the presence of two or more passengers in the vehicle while leaving the other passenger in the vehicle and that a hazardous situation has occurred around the vehicle thereafter, the notification controller 101 notifies the passenger away from the vehicle of the situation. In the present description, the passenger having moved away from the vehicle is called an off-board passenger and the passenger left in the vehicle is called an on-board passenger. Notification from the notification controller 101 to the off-board passenger is called outward notification. Furthermore, a vehicle as a target of detection of a surrounding hazardous situation by the notification controller 101 is called a target vehicle, and a vehicle other than the target vehicle is called a non-target vehicle. Detection of a hazardous situation and making of the outward notification by the notification controller 101 are also called watching over.

Referring to FIG. 1, the notification controller 101 is mounted on a target vehicle V. Alternatively, the notification controller 101 may be configured by combining at least some of a vehicle-mounted device mounted on the target vehicle V, a server provided outside the target vehicle V, and a portable terminal of a passenger brought into the target vehicle V.

The notification controller 101 is connected to an in-vehicle information acquisition device 51, a surrounding information acquisition device 52, and a communication device 53 and is allowed to use these devices. The in-vehicle information acquisition device 51, the surrounding information acquisition device 52, and the communication device 53 are mounted on the target vehicle V.

The in-vehicle information acquisition device 51 acquires in-vehicle information about the target vehicle V. The in-vehicle information is information about the inside of the target vehicle V and includes information to be used for detecting change in an on-board passenger in the target vehicle V. If the in-vehicle information includes a captured image of the on-board passenger, the configuration of the in-vehicle information acquisition device 51 includes an imaging device mounted on the target vehicle V and used for capturing an image of the inside of the vehicle. If the in-vehicle information includes detection information from a seating sensor on a seat, the configuration of the in-vehicle information acquisition device 51 includes a seating sensor on a seat in the target vehicle V.

The surrounding information acquisition device 52 acquires surrounding information about the target vehicle V. The surrounding information about the target vehicle V is information about the surrounding of the target vehicle V, namely, about the outside of the target vehicle V, and includes information to be used for detecting the occurrence of a hazardous situation around the target vehicle V. If the surrounding information about the target vehicle V includes a captured image of the surrounding of the target vehicle V, the configuration of the surrounding information acquisition device 52 includes an imaging device mounted on the target vehicle V and used for capturing an image of the surrounding of the target vehicle V. In this case, the surrounding of the target vehicle V may be a range to be imaged by the imaging device belonging to the surrounding information acquisition device 52, for example.

The communication device 53 makes radio communication with a communication terminal 61 outside the target vehicle V. The communication terminal 61 is a terminal available to an off-board passenger and is a portable terminal belonging to the off-board passenger that is typically a smartphone or a wearable terminal.

The notification controller 101 has a configuration including an on-board passenger judgment unit 11, a hazard judgment unit 12, and a notification control unit 13. The on-board passenger judgment unit 11 judges whether there is an on-board passenger in the target vehicle V using in-vehicle information acquired from the in-vehicle information acquisition device 51. The judgment as to whether an on-board passenger is in the target vehicle V is called on-board passenger judgment.

The hazard judgment unit 12 judges whether a hazardous situation is occurring around the target vehicle V using surrounding information acquired from the surrounding information acquisition device 52. The judgment as to whether a hazardous situation is occurring around the target vehicle V is called hazard judgment.

The notification control unit 13 judges whether to make notification to an off-board passenger, namely, to make outward notification on the basis of results of the on-board passenger judgment and the hazard judgment. If the outward notification is to be made, the notification control unit 13 determines a substance of the notification and causes the communication device 53 to make radio communication with the communication terminal 61 on the basis of the determined substance. The communication device 53 makes radio communication with the communication terminal 61 under control by the notification control unit 13, thereby transmitting the notification substance to the communication terminal 61. This allows the off-board passenger to check the notification substance through the communication terminal 61.

In FIG. 1, the in-vehicle information acquisition device 51 and the surrounding information acquisition device 52 are illustrated as structures separate from the notification controller 101. However, the in-vehicle information acquisition device 51 and the surrounding information acquisition device 52 may be incorporated in the notification controller 101. More specifically, the in-vehicle information acquisition device 51 and the surrounding information acquisition device 52 may be incorporated in the on-board passenger judgment unit 11 and the hazard judgment unit 12 respectively.

The communication device 53 is not limited to a device constantly mounted on the target vehicle V but may be a portable communication terminal belonging to a passenger, for example. The communication device 53 may also be a device existing outside the target vehicle V such as a communication infrastructure installed on a road.

A-2. Behavior

Figure 2:
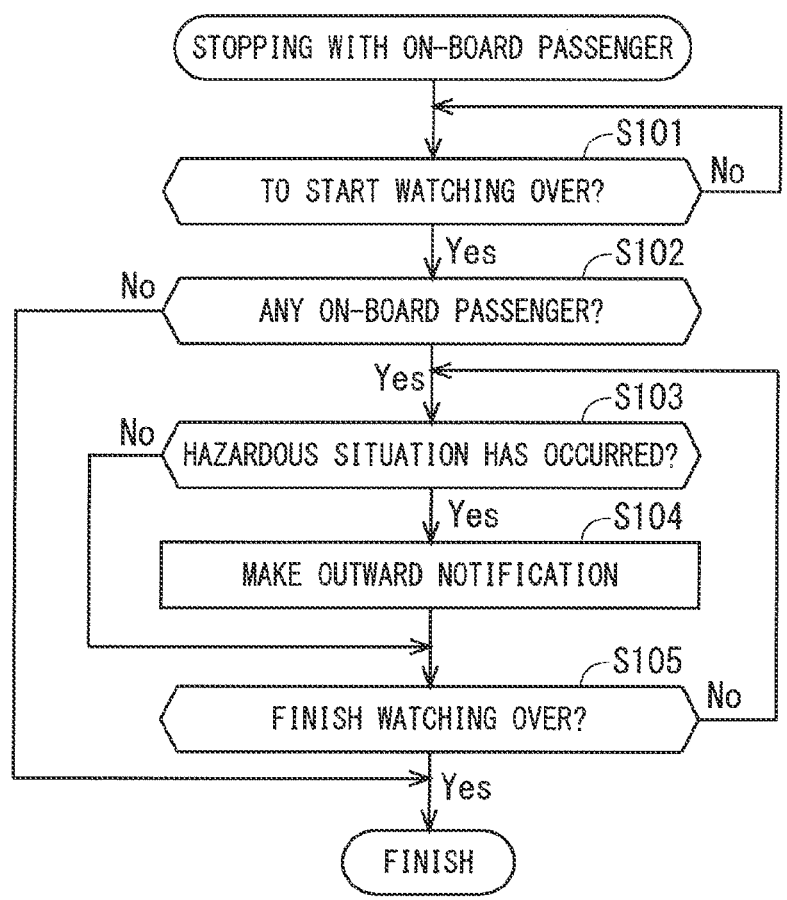
FIG. 2 is a flowchart showing the behavior of the notification controller according to the first embodiment.

FIG. 2 is a flowchart showing the behavior of the notification controller 101 according to the first embodiment. The behavior of the notification controller 101 will be described below in line with FIG. 2. If the target vehicle V is stopping while at least one passenger is in the target vehicle V, the notification controller 101 judges whether to start watching over (step S101). The watching over by the notification controller 101 is done if a driver of the target vehicle V is temporarily away from the target vehicle V at a stop-off point during driving and the family at rest stays in the target vehicle V, for example. In this case, the driver of the target vehicle V is the off-board passenger and the family resting in the vehicle is the on-board passenger.

The off-board passenger may input a starting command for watching over to the notification controller 101 using an input device not shown in FIG. 1. In this case, the notification controller 101 starts watching over in response to receipt of the starting command for watching over.

If the notification controller 101 determines that at least one passenger has gotten out of the target vehicle V to be outside the vehicle, the notification controller 101 may automatically start watching over. In this case, the notification controller 101 can determine that the passenger has gotten out of the target vehicle V on the basis of in-vehicle information acquired from the in-vehicle information acquisition device 51. The in-vehicle information acquisition device 51 mentioned herein includes a camera for capturing an image of the inside of the target vehicle V, a radio wave sensor for emitting a radio wave to the inside of the vehicle, or a seating sensor installed on a seat, for example. The in-vehicle radio wave sensor measures a distance to an object in the vehicle by emitting a radio wave to the inside of the target vehicle V and receiving a reflected wave at an antenna. The notification controller 101 can detect opening or closing of a door of the target vehicle V or reduction in on-board passengers on the basis of measurement information from the radio wave sensor, and can judge that the passenger has gotten out of the target vehicle V on the basis of such detection. The in-vehicle information acquisition device 51 may be a proximity sensor that detects a communication terminal belonging to a passenger of the target vehicle V.

The notification controller 101 repeats step S101 until watching over is judged to be started. If the notification controller 101 judges that watching over is to be started in step S101, the notification controller 101 proceeds to a process in step S102.

In step S102, the on-board passenger judgment unit 11 makes on-board passenger judgment as to whether an on-board passenger is present on the basis of in-vehicle information acquired from the in-vehicle information acquisition device 51. The in-vehicle information used in this step is the same as the in-vehicle information described above in relation to step S101. If the on-board passenger judgment unit 11 judges that there is no on-board passenger (No in step S102), the watching over is finished. On the other hand, if the on-board passenger judgment unit 11 judges that there is an on-board passenger (Yes in step S102), the process by the notification controller 101 proceeds to step S103.

In step S103, the hazard judgment unit 12 makes hazard judgment as to whether a hazardous situation is occurring around the target vehicle V on the basis of surrounding information acquired from the surrounding information acquisition device 52. The surrounding information acquisition device 52 mentioned herein includes an imaging device for capturing an image of the surrounding of the target vehicle V or a radio wave sensor for emitting a radio wave to the surrounding of the target vehicle V, for example. If the hazard judgment unit 12 judges that there is no hazardous situation (No in step S103), the watching over is finished. On the other hand, if the hazard judgment unit 12 judges that there is a hazardous situation (Yes in step S103), the process by the notification controller 101 proceeds to step S104.

In step S104, the notification control unit 13 determines a substance of notification to the off-board passenger and causes the communication device 53 to transmit the determined notification substance to the communication terminal 61, thereby making outward notification. The notification substance is output to the communication terminal 61 having received the notification from the communication device 53. This causes the off-board passenger to check the outward notification through the communication terminal 61.

After step S104, the notification controller 101 judges whether to finish the watching over (step S105). If the notification controller 101 judges that the watching over is not to be finished, the notification controller 101 returns to the process in step S103. If the notification controller 101 judges that the watching over is to be finished, the watching over is finished.

The off-board passenger may input a finish command for the watching over to the notification controller 101 using an input device not shown in FIG. 1. In this case, the notification controller 101 finishes the watching over in response to receipt of the finish command for watching over.

If the notification controller 101 determines that the off-board passenger has returned to the target vehicle V and gotten on the vehicle, the notification controller 101 may finish the watching over automatically. In this case, the notification controller 101 can determine that the off-board passenger has returned to the target vehicle V and gotten on the vehicle on the basis of in-vehicle information acquired from the in-vehicle information acquisition device 51.

A-3. Effects

The notification controller 101 includes: the on-board passenger judgment unit 11, if at least one passenger of two or more passengers in the target vehicle V gets out of the vehicle to become an off-board passenger, the on-board passenger judgment unit 11 judging whether there is a different passenger staying in the target vehicle V; the hazard judgment unit 12 that judges whether a hazardous situation is occurring around the target vehicle V if there is an on-board passenger who is the different passenger staying in the target vehicle V; and the notification control unit 13 that makes radio communication with a communication terminal of the off-board passenger to make outward notification that is notification indicating the occurrence of the hazardous situation to the off-board passenger if the hazard judgment unit 12 judges that the hazardous situation is occurring. In this way, the off-board passenger can receive notification if a hazard comes near the on-board passenger from the outside of the vehicle. This allows the off-board passenger to carry out a thing to do in relief outside the vehicle. Furthermore, compared to a system that makes the off-board passenger check a situation in the vehicle minutely or a system that notifies the off-board passenger of a situation in the vehicle regularly, the off-board passenger can be relieved from being bothered by notifications given excessively frequently.

B. Second Embodiment

B-1. Configuration

Figure 3:
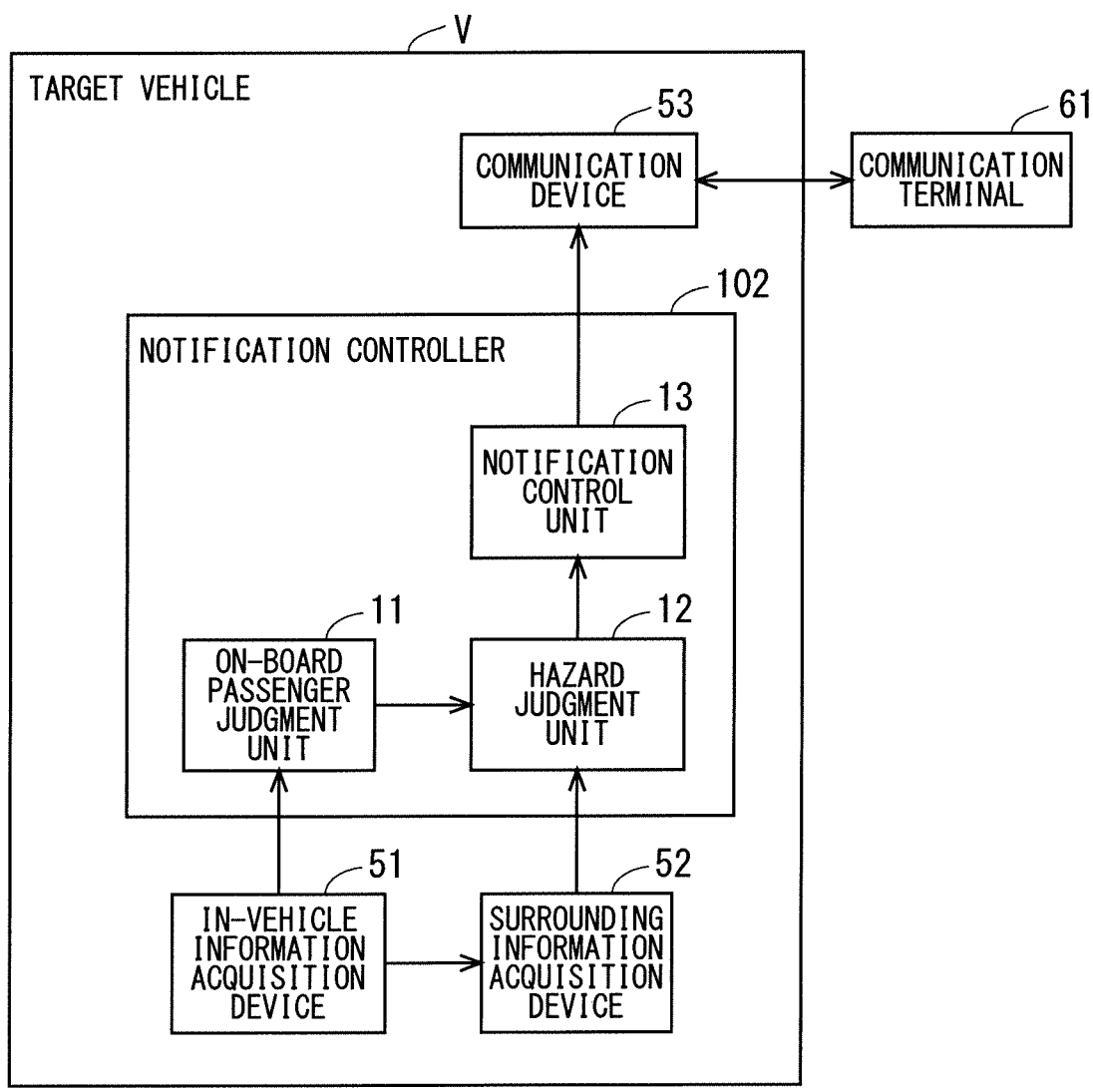
FIG. 3 is a block diagram showing the configuration of a notification controller according to a second embodiment.

FIG. 3 is block diagram showing the configuration of a notification controller 102 according to a second embodiment. The notification controller 102 has the same configuration as the notification controller 101. In the notification controller 102, the hazard judgment unit 12 not only makes hazard judgment but also judges a hazardous level of a hazardous situation having occurred. The notification control unit 13 determines a notification substance in outward notification in response to the hazardous level of the hazardous situation.

B-2. Behavior

Figure 4:
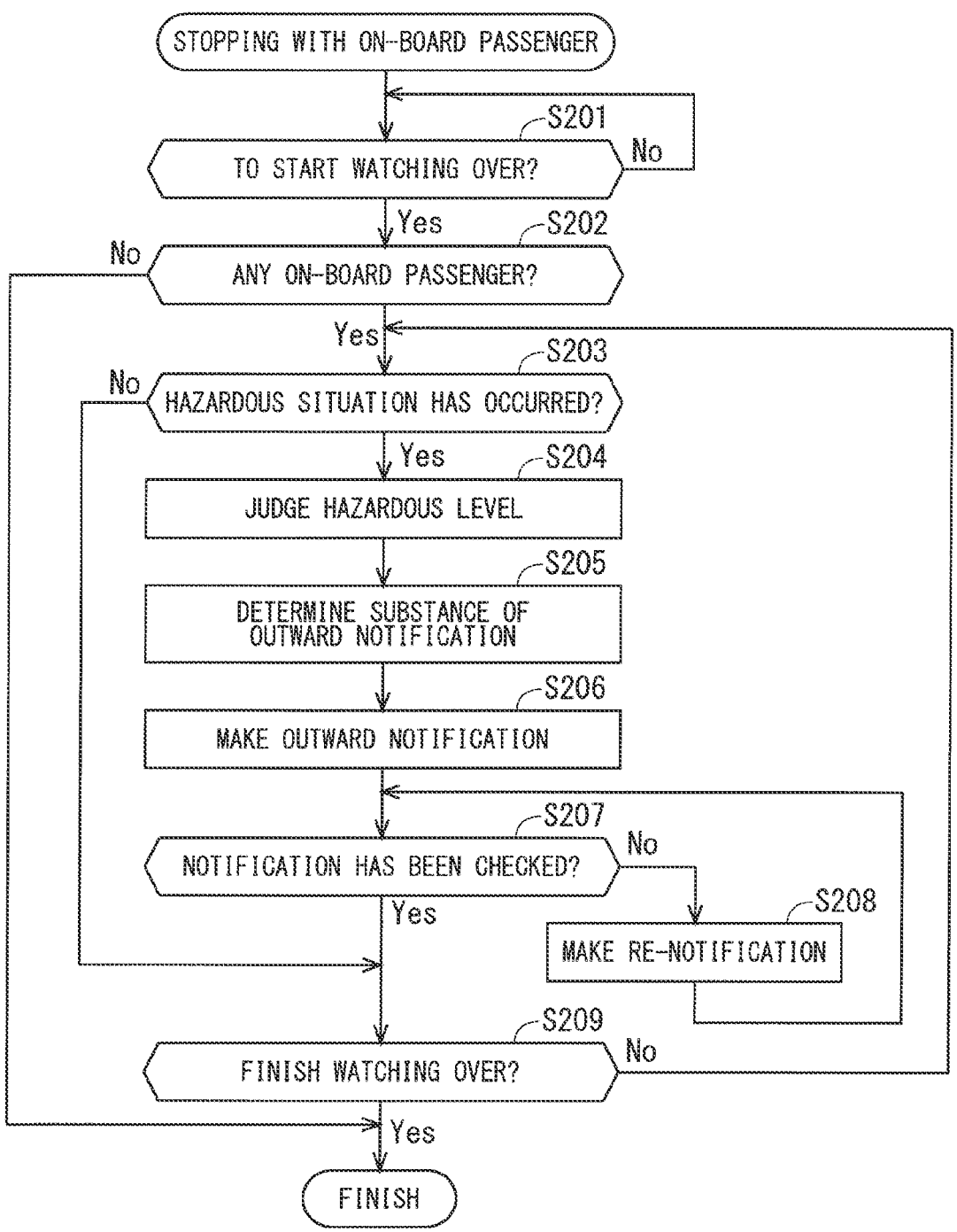
FIG. 4 is a flowchart showing the behavior of the notification controller according to the second embodiment.

FIG. 4 is a flowchart showing the behavior of the notification controller 102 according to the second embodiment. The behavior of the notification controller 102 will be described below in line with the flow in FIG. 4. Steps S201 to S203 in FIG. 4 are the same as steps S101 to S103 in FIG. 2 respectively. If the hazard judgment unit 12 judges that a hazardous situation has occurred around the target vehicle V on the basis of surrounding information acquired from the surrounding information acquisition device 52 (Yes in step S203), the hazard judgment unit 12 judges a hazardous level of the hazardous situation (step S204).

Next, the notification control unit 13 determines a substance of outward notification in response to the hazardous level of the hazardous situation (step S205) and makes outward notification (step S206).

Then, the notification control unit 13 judges whether an off-board passenger has checked the outward notification (step S207). For example, if the off-board passenger checks the outward notification, feedback information is transmitted from the communication terminal 61 to the communication device 53. The notification control unit 13 can judge that the off-board passenger has checked the outward notification on the basis of the transmitted feedback information.

If the feedback information is not acquired within a predetermined period from when the outward notification is made in step S206, the notification control unit 13 judges that the off-board passenger has not checked the outward notification (No in step S207), and makes re-notification (step S208). The notification control unit 13 may make the re-notification in a style different from that of the initial notification. If the communication terminal 61 is configured to output voice or vibration in response to receipt of outward notification, for example, the notification control unit 13 may make voice or vibration from the communication terminal 61 at the time of the re-notification larger than that at the time of the initial notification or may change the type of voice or vibration to a more noticeable one.

After making the re-notification, the notification control unit 13 judges whether the off-board passenger has checked the re-notification (step S207). If feedback information is not acquired from the communication terminal 61 within a predetermined period from when the re-notification is made, the notification control unit 13 judges that the off-board passenger has not checked the re-notification (No in step S207), and makes re-notification for a second time (step S208). In this way, the notification control unit 13 repeats the outward notification until the off-board passenger checks the notification. As the outward notification is made more frequently, the notification control unit 13 may shorten time in step S207 waiting for the feedback information from the communication terminal 61 to shorten a time interval between the outward notifications.

If the notification control unit 13 judges in step S207 that the off-board passenger has checked the outward notification, the notification controller 102 judges whether to finish watching over (step S209). Step S209 is the same as step S105 in FIG. 2. If the notification controller 102 judges that the watching over is not to be finished, the notification controller 102 returns to the process in step S203. If the notification controller 102 judges that the watching over is to be finished, the watching over is finished.

Judgment of a hazardous level by the hazard judgment unit 12 will be described next. FIG. 5 shows examples of a hazardous level responsive to each type of a hazardous factor including a human, a non-target vehicle, an animal, and an accident. In FIG. 5, a hazardous level is from 1 at the lowest to 5 at the highest.

A hazardous level of a human will be described. If there is a human within a predetermined distance from the target vehicle V, the hazard judgment unit 12 judges that a hazardous situation is occurring around the target vehicle V. In this case, a hazardous factor is the human. The hazard judgment unit 12 judges a behavior by the human as a hazardous factor, a belonging to the human, the presence or absence of touch with the target vehicle V from the human, etc. on the basis of surrounding information acquired from the surrounding information acquisition device 52, and judges a hazardous level as follows on the basis of the judged items. First, if the human as a hazardous factor does not make an unstable behavior and is a mere passerby, the hazard judgment unit 12 judges that a hazardous level is 1. If the human as a hazardous factor gazes at the target vehicle V and hangs around the target vehicle V continuously without moving away from the target vehicle V, the hazard judgment unit 12 judges that a hazardous level is 2. If the human as a hazardous factor looks into the target vehicle V, the hazard judgment unit 12 judges that a hazardous level is 3. If the human as a hazardous factor has a hazardous item such as a pistol or a knife, the hazard judgment unit 12 judges that a hazardous level is 4. If the human as a hazardous factor touches the target vehicle V and makes harmful action such as beating the target vehicle V, the hazard judgment unit 12 judges that a hazardous level is 5. In this way, if a factor of a hazardous situation is a human existing around the target vehicle V, the hazard judgment unit 12 judges a hazardous level on the basis of at least any of a behavior by the human, a line of sight of the human, and a belonging to the human.

A hazardous level of a non-target vehicle will be described next. If there is a non-target vehicle within a predetermined distance from the target vehicle V, the hazard judgment unit 12 determines the occurrence of a hazardous situation and judges that a hazardous factor is the non-target vehicle. The hazard judgment unit 12 judges a behavior by the non-target vehicle, a behavior by a passenger in the non-target vehicle, etc. on the basis of surrounding information acquired from the surrounding information acquisition device 52, and judges a hazardous level as follows on the basis of the judged items. First, if the non-target vehicle is stopping with no human therein, the hazard judgment unit 12 judges that a hazardous level is 1. If the non-target vehicle is a manned vehicle and stops after moving closer to the target vehicle V, the hazard judgment unit 12 judges that a hazardous level is 2. If the non-target vehicle is a manned vehicle and a passenger of the non-target vehicle looks into the target vehicle V, the hazard judgment unit 12 judges that a hazardous level is 3. If a suspicious radio wave is transmitted from the non-target vehicle, the hazard judgment unit 12 judges that a hazardous level is 4. If the non-target vehicle touches the target vehicle V, the hazard judgment unit 12 judges that a hazardous level is 5. In this way, if a factor of a hazardous situation is a non-target vehicle existing around the target vehicle V, the hazard judgment unit 12 judges a hazardous level on the basis of at least one of a line of sight of a human in the non-target vehicle and a radio wave signal received from the non-target vehicle.

A hazardous level of an animal will be described next. If there is an animal within a predetermined distance from the target vehicle V, the hazard judgment unit 12 determines the occurrence of a hazardous situation and judges that a hazardous factor is the animal. The hazard judgment unit 12 judges the type of the animal on the basis of surrounding information acquired from the surrounding information acquisition device 52, and judges a hazardous level in response to the type of the animal. For example, the hazard judgment unit 12 judges a hazardous level in descending order from a large fierce animal, a middle fierce animal, a middle animal, a small animal, and a small insect.

A hazardous level of an accident will be described next. If a hazardous factor is an accident, the hazard judgment unit 12 judges a hazardous level in response to the type of the accident. For example, the hazard judgment unit 12 judges that rain corresponds to a hazardous level 1, heavy snow corresponds to a hazardous level 2, an earthquake or fire corresponds to a hazardous level 3, sudden swollenness corresponds to a hazardous level 4, and a typhoon or a twister corresponds to a hazardous level 5.

While a hazardous level is divided into five ranks in the example shown in FIG. 5, the hazard judgment unit 12 may judge a hazardous level more finely.

Figure 6:
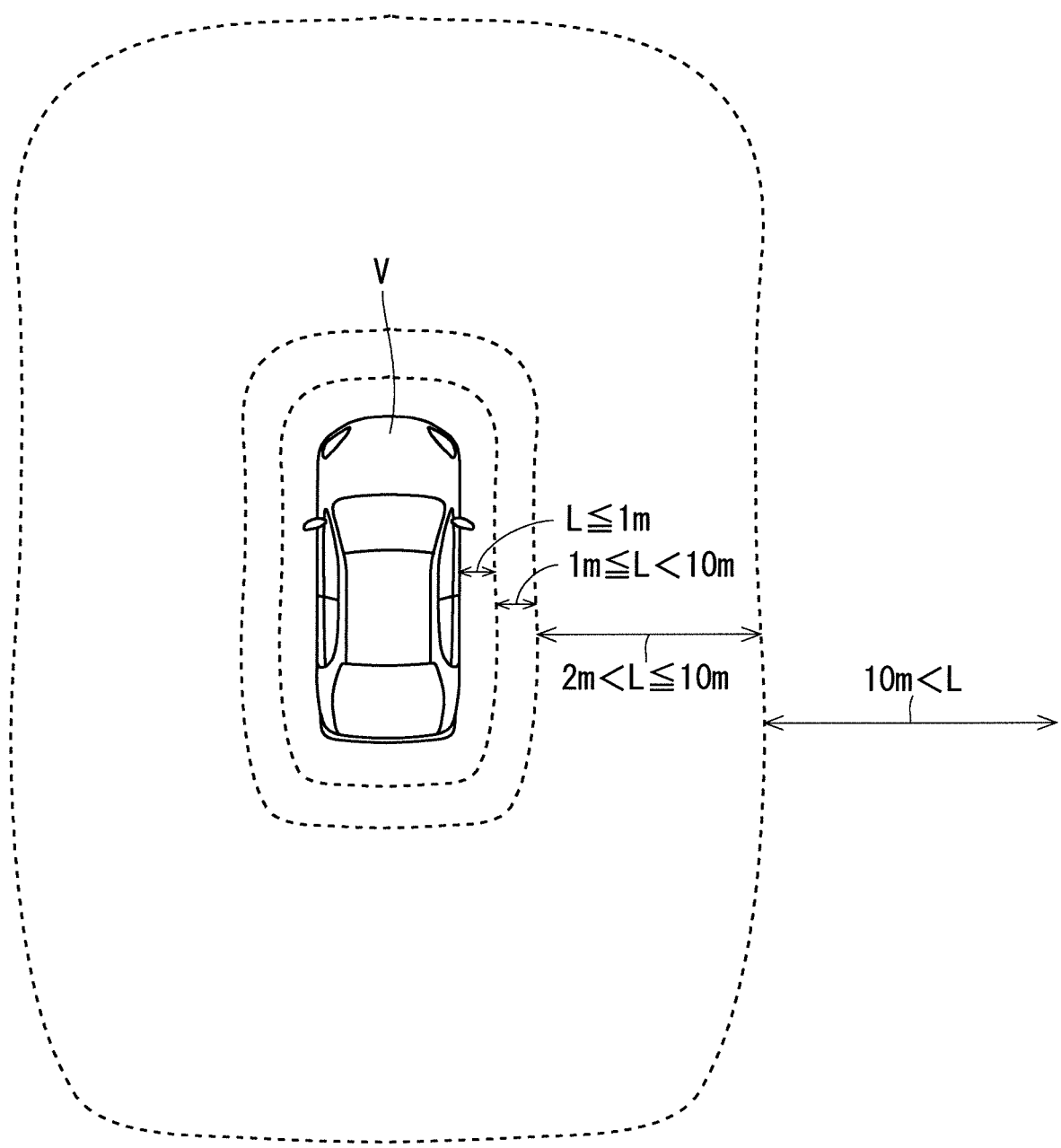
FIG. 6 explains a relationship between a distance of a target vehicle and a hazardous level.

FIG. 6 explains a relationship between a distance of the target vehicle V and a hazardous level. As shown in FIG. 6, the hazard judgment unit 12 may judge a hazardous level on the basis of a distance between the target vehicle V and a hazardous factor. The hazard judgment unit 12 can acquire a distance between the target vehicle V and the hazardous factor from the surrounding information acquisition device 52 that may be an out-vehicle camera or an out-vehicle radio wave sensor, for example. Dashed lines in FIG. 6 show a threshold for a distance L between the target vehicle V and the hazardous factor in relation to a hazardous level. If the distance L is greater than 10 m, the hazard judgment unit 12 judges that a hazardous level is 1. If the distance L is greater than 2 m and equal to or less than 10 m, the hazard judgment unit 12 judges that a hazardous level is 2. If the distance L is greater than 1 m and equal to or less than 2 m, the hazard judgment unit 12 judges that a hazardous level is 3. If the distance L is equal to or less than 1 m, the hazard judgment unit 12 judges that a hazardous level is 4. A threshold for the distance L may be changed in response to the performance of the out-vehicle camera or the out-vehicle radio wave sensor as the surrounding information acquisition device 52. A threshold for the distance L may also be changed in response to a direction from the target vehicle V. For example, even at the same distance L, a direction at a blind angle from a passenger such as a direction of a pillar or a frontward direction in which the inside of the vehicle is easy to check from the outside of the vehicle may be given a higher hazardous level than other directions.

In order for the off-board passenger to recognize outward notification more easily as a hazardous level becomes higher, the notification control unit 13 changes the outward notification to a substance of higher recognizability. The recognizability of the outward notification increases as an interval between re-notifications becomes shorter, as re-notification is made more frequently, or as vibration or sound from the communication terminal 61 responsive to receipt of notification becomes greater, for example. For this reason, the notification control unit 13 increases the recognizability of the outward notification by changing the above-described parameter for the outward notification in response to a hazardous level.

In the exemplary cases shown in FIGS. 5 and 6, if a passerby is passing at a distance exceeding 2 m and equal to or less than 10 m from the target vehicle V, for example, the notification control unit 13 makes outward notification only once and then does not make outward notification even if the same situation occurs again thereafter. On the other hand, if a human gazing at the target vehicle V is at a distance exceeding 2 m and equal to or less than 10 m from the target vehicle V, the notification control unit 13 makes notification minute by minute until the off-board passenger checks the notification. Furthermore, if the human gazing at the target vehicle V is at a distance exceeding 1 m and equal to or less than 2 m from the target vehicle V, the notification control unit 13 increases a frequency of notification to make notification every 20 seconds until the off-board passenger checks the notification.

Figure 7:
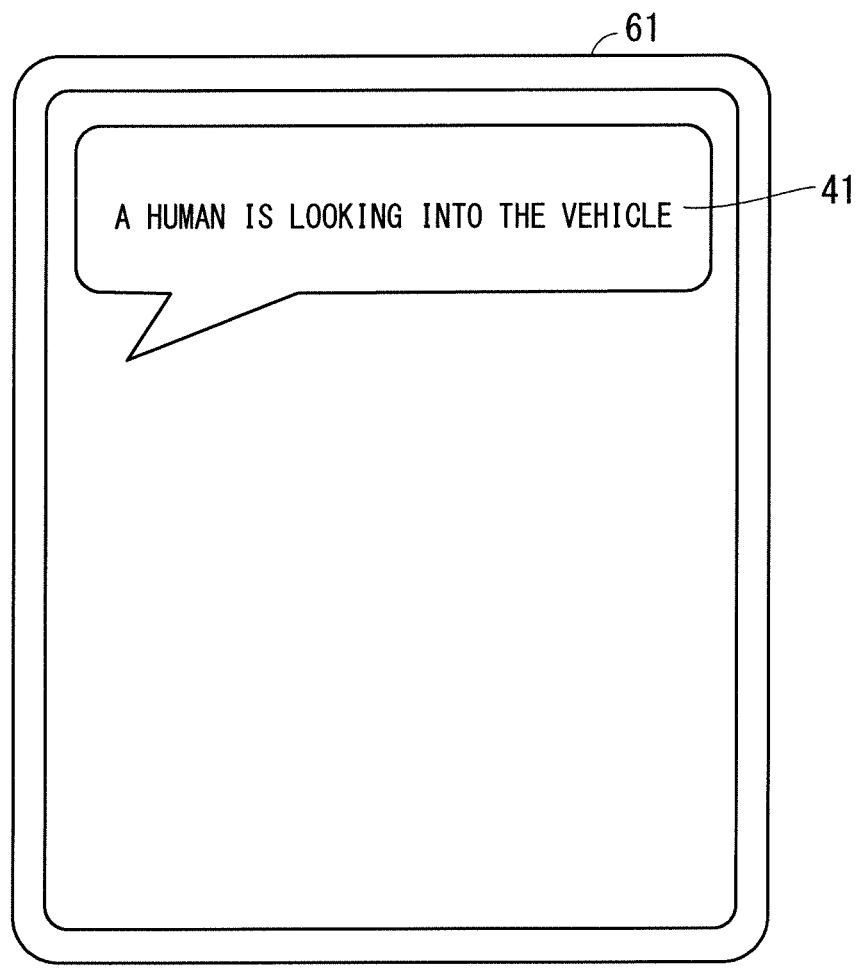
FIG. 7 shows an example of outward notification according to the second embodiment.
Figure 8:
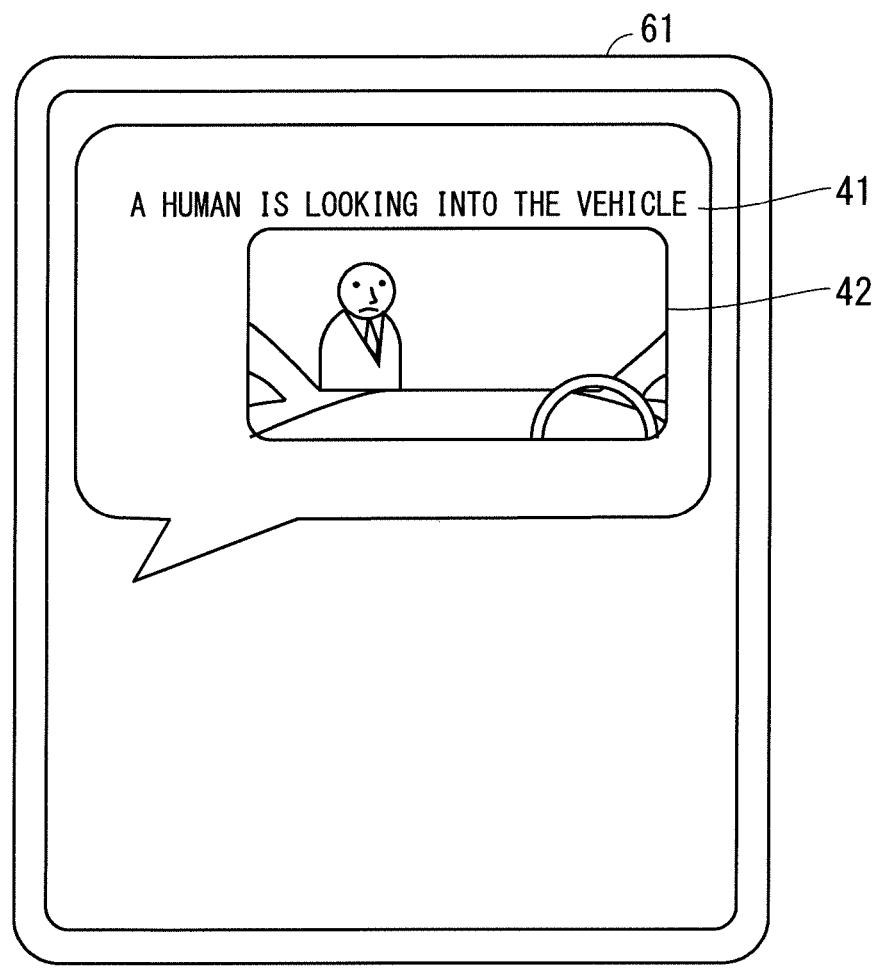
FIG. 8 shows an example of the outward notification according to the second embodiment.
Figure 9:
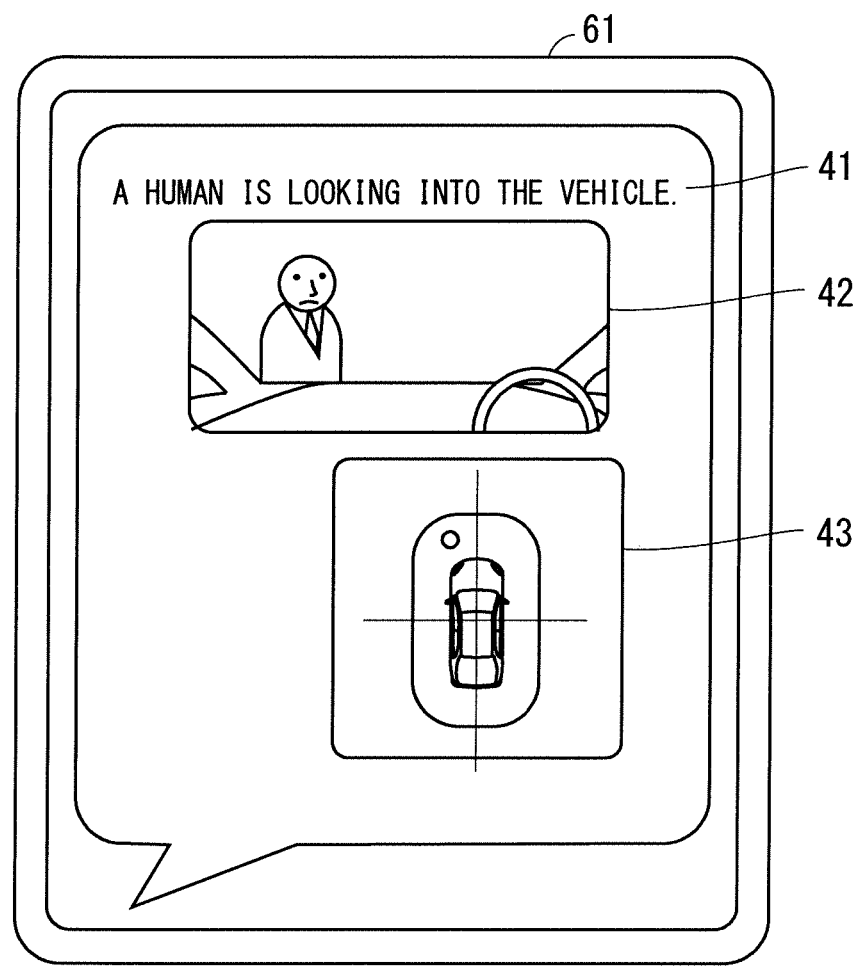
FIG. 9 shows an example of the outward notification according to the second embodiment.

FIGS. 7 to 9 each show an example of notification on a screen of the communication terminal 61 to the off-board passenger. Notification is transmitted from the communication device 53 to the communication terminal 61 under control by the notification control unit 13. If the off-board passenger performs operation of checking notification received at the communication terminal 61, images, etc. shown in FIGS. 7 to 9 are displayed on the screen of the communication terminal 61. In the example shown in FIG. 7, text 41 about a hazardous factor such as "A human is looking into the vehicle." is displayed on the screen of the communication terminal 61.

In the example shown in FIG. 8, a real-time image 42 of the surrounding of the target vehicle V is displayed on the screen of the communication terminal 61 in addition to the text 41. The real-time image 42 allows the off-board passenger to see the type of a human looking into the target vehicle V.

In the example shown in FIG. 9, an image 43 indicating the position of a hazardous factor relative to the target vehicle V is displayed on the screen of the communication terminal 61 in addition to the text 41 and the real-time image 42. The image 43 shows that the hazardous factor is ahead of the target vehicle V on the left.

In the examples shown in FIGS. 7 to 9, the substance of the text 41 may be output as voice from a speaker provided in the communication terminal 61. The notification illustrated in FIG. 8 has a larger amount of information than the notification illustrated in FIG. 7. The notification illustrated in FIG. 9 has a larger amount of information than the notification illustrated in FIG. 8. As a hazardous level becomes higher, the notification control unit 13 may increase an amount of information in outward notification.

If a hazardous level is low, for example, if a hazardous level is 1 in the example shown in FIG. 5, the notification control unit 13 need not make outward notification.

B-3. Effects

In the notification controller 102 of the second embodiment, if the hazard judgment unit 12 judges that a hazardous situation is occurring, the hazard judgment unit 12 judges a hazardous level indicating a level of the hazardous situation, and the notification control unit 13 judges whether to make outward notification and determines a substance of the outward notification in response to the hazardous level. Thus, the notification controller 102 allows the off-board passenger to receive outward notification responsive to a hazardous level.

C. Third Embodiment

C-1. Configuration

Figure 10:
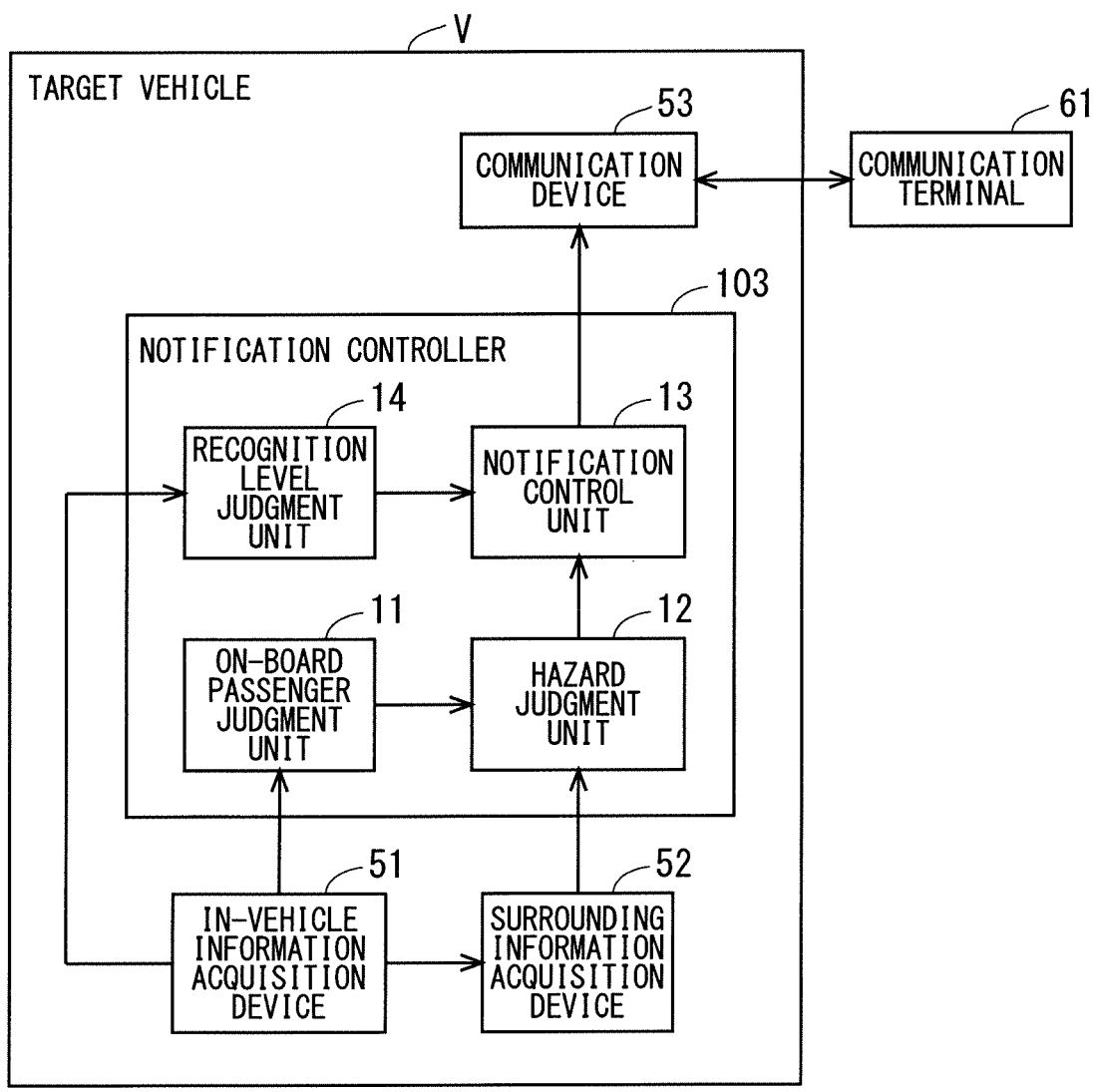
FIG. 10 is a block diagram showing the configuration of a notification controller according to a third embodiment.

FIG. 10 is a block diagram showing the configuration of a notification controller 103 according to a third embodiment. The notification controller 103 includes a recognition level judgment unit 14 in addition to the configuration of the notification controller 102 of the second embodiment. If a hazardous situation has occurred around the target vehicle V, the recognition level judgment unit 14 judges a recognition level indicating to which level an off-board passenger recognizes the hazardous situation on the basis of in-vehicle information acquired from the in-vehicle information acquisition device 51.

If a hazardous situation has occurred around the target vehicle V, the notification control unit 13 judges whether to make outward notification to the off-board passenger and a style of the outward notification on the basis of both a hazardous level of the hazardous situation and a level of recognition of the hazardous situation by an on-board passenger.

C-2. Behavior

Figure 11:
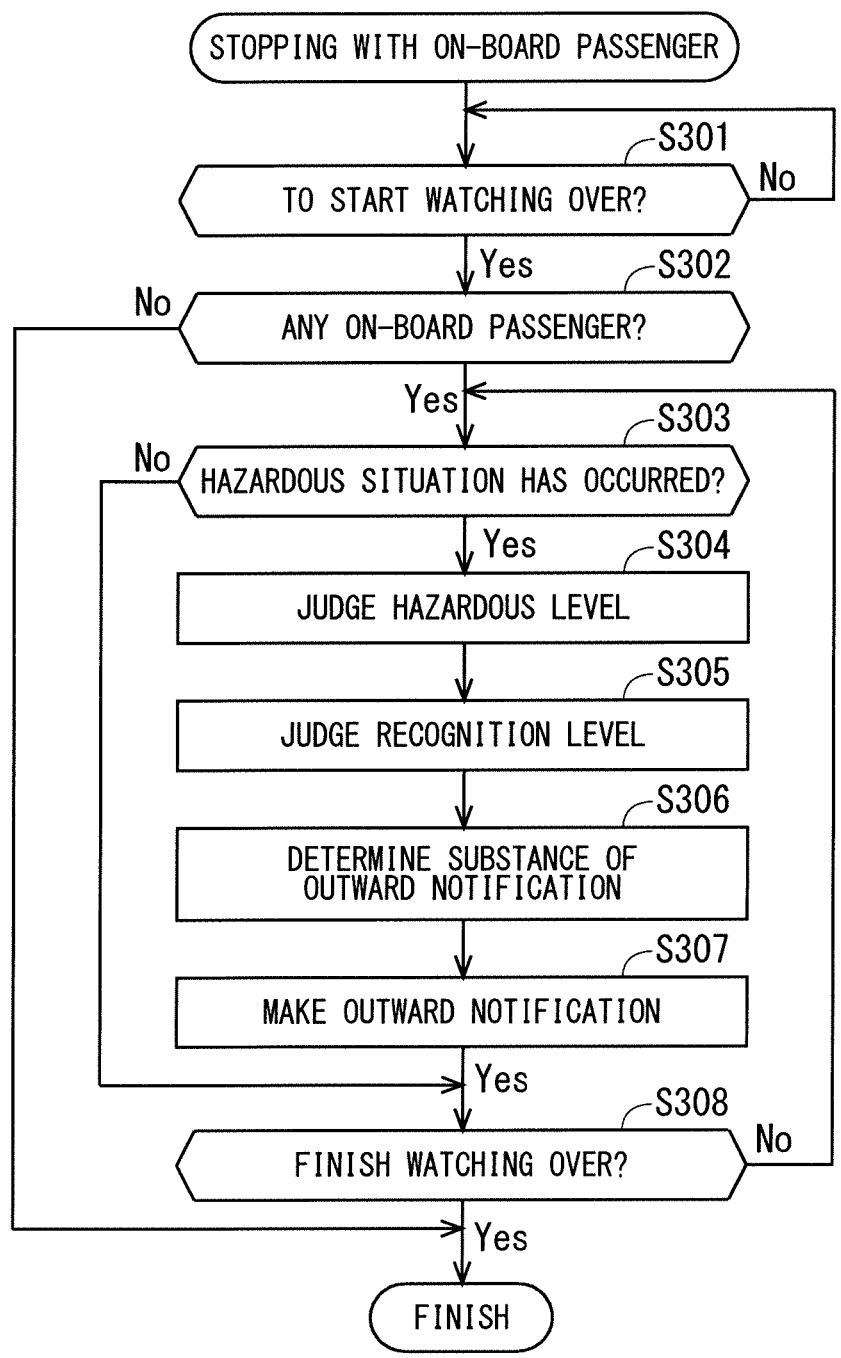
FIG. 11 is a flowchart showing the behavior of the notification controller according to the third embodiment.

FIG. 11 is a flowchart showing the behavior of the notification controller 103 according to the third embodiment. The behavior of the notification controller 103 will be described below in line with the flow in FIG. 11. Steps S301 to S304 are the same as steps S201 to S204 in FIG. 4 respectively, so that description of these steps will be omitted.

After the hazard judgment unit 12 judges a hazardous level of a hazardous situation in step S304, the recognition level judgment unit 14 judges a level of recognition of the hazardous situation by the on-board passenger (step S305). More specifically, the recognition level judgment unit 14 judges a consciousness level, a state, or a direction of a line of sight of the on-board passenger on the basis of in-vehicle information acquired from the in-vehicle information acquisition device 51, and judges to which level the on-board passenger recognizes the appearance of a hazardous factor around the target vehicle V on the basis of the judged items.

Next, the notification control unit 13 determines a style of outward notification to the off-board passenger on the basis of both the hazardous level of the hazardous situation and the level of recognition of the hazardous situation by the on-board passenger (step S306). Subsequent step S307 and step S308 are the same as step S206 and step S209 in FIG. 4 respectively.

The recognition level judgment unit 14 judges a level of recognition of the hazardous situation by the on-board passenger on the basis of a behavior by the on-board passenger. FIG. 12 shows a correspondence between the behavior by the on-board passenger and a recognition level. A recognition level is from 1 at the lowest to 5 at the highest. If the on-board passenger is having a nap, for example, the recognition level judgment unit 14 judges that a recognition level is 1. If the on-board passenger is having conversation or operating a smartphone, the recognition level judgment unit 14 judges that a recognition level is 2. If the on-board passenger does not see a hazardous factor but looks out of the vehicle, the recognition level judgment unit 14 judges that a recognition level is 3. If the on-board passenger sees the hazardous factor, the recognition level judgment unit 14 judges that a recognition level is 4.

FIG. 13 illustrates styles of the outward notification responsive to a recognition level and a hazardous level. In the example shown in FIG. 13, outward notification is not made in a situation where a hazardous level is low that is 1 and a level of recognition by the on-board passenger is high that is equal to or greater than 2. If a hazardous level is 1 and a recognition level is 1 and if a hazardous level is equal to or greater than 2, outward situation notification is made except in the case shown next where outward warning notification is made. If a hazardous level is equal to or greater than 4 and a recognition level is equal to or less than 2 and if a hazardous level is 5, the outward warning notification is made. Here, while both the outward situation notification and the outward warning notification are outward notifications, the outward warning notification means notification of higher recognizability than the outward situation notification. The recognizability of the outward notification is as described above in the second embodiment.

Figure 14:
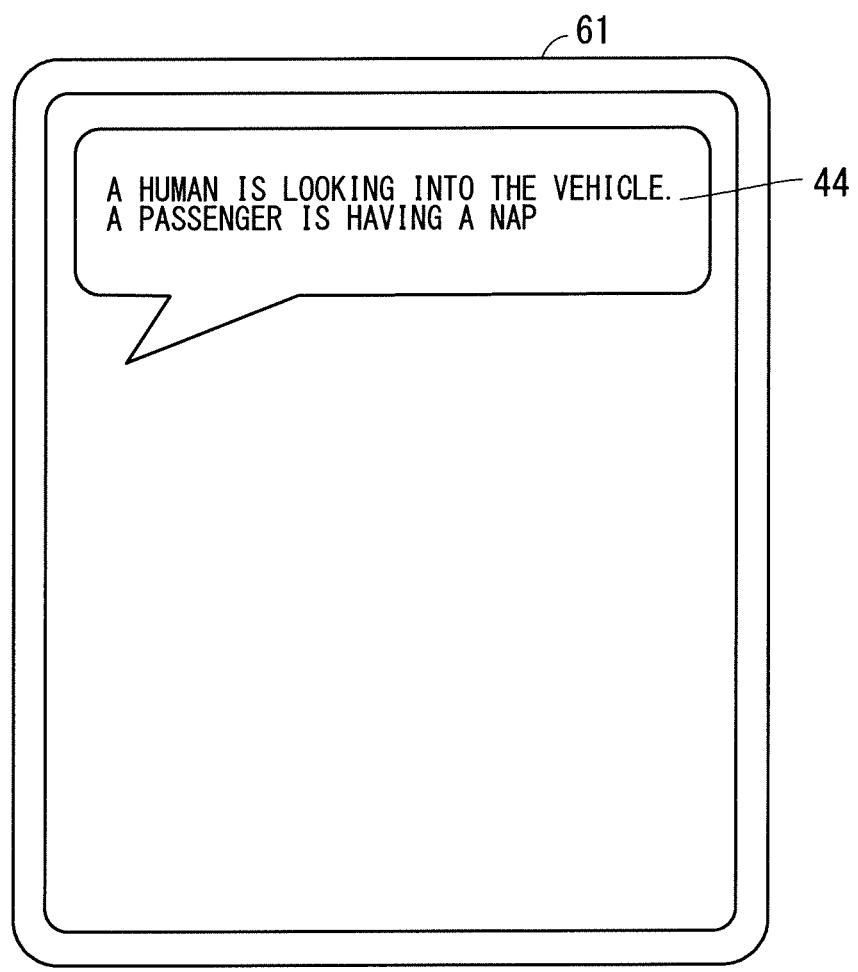
FIG. 14 shows examples of outward notification according to the third embodiment.
Figure 15:
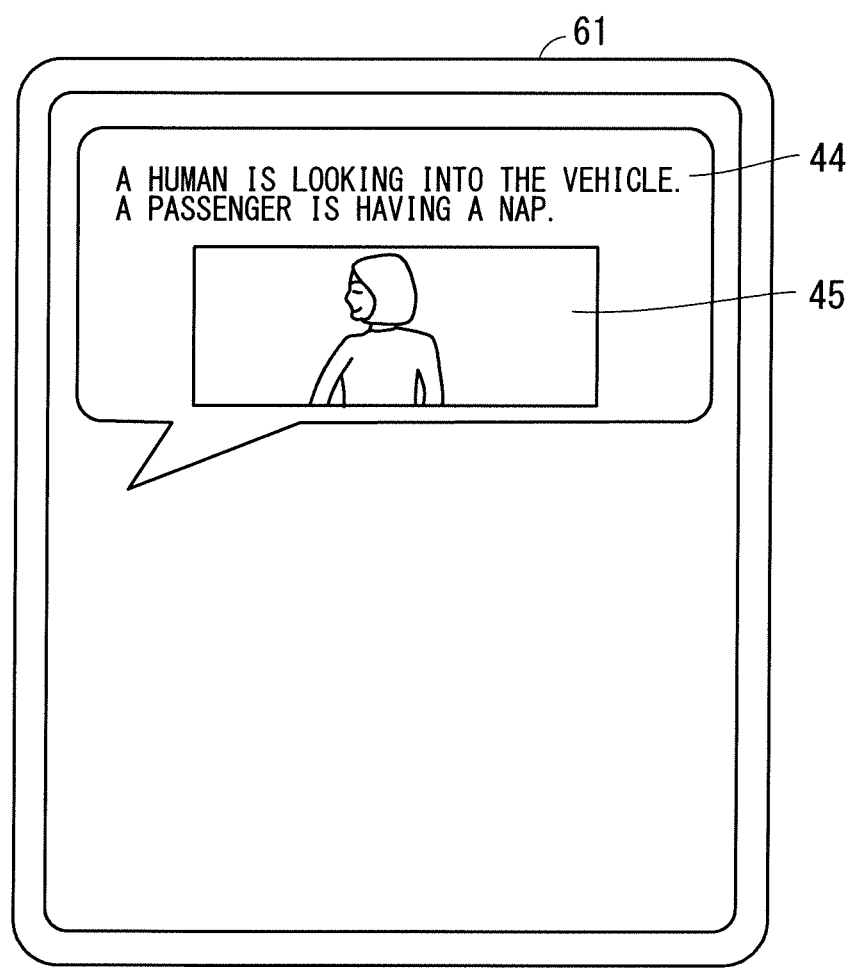
FIG. 15 shows examples of the outward notification according to the third embodiment.

FIGS. 14 and 15 each show an example of notification on the screen of the communication terminal 61 to the off-board passenger. Notification is transmitted from the communication device 53 to the communication terminal 61 under control by the notification control unit 13. If the off-board passenger performs operation of checking notification received at the communication terminal 61, images, etc. shown in FIG. 14 or are displayed on the screen of the communication terminal 61. In the example shown in FIG. 14, text 44 is displayed on the screen of the communication terminal 61. The text 44 includes text about a hazardous factor such as "A human is looking into the vehicle." and text about a level of recognition by the on-board passenger such as "A passenger is having a nap." In the example shown in FIG. 15, a real-time image 45 of the on-board passenger is displayed on the screen of the communication terminal 61 in addition to the text 44. The real-time image 45 allows the off-board passenger to grasp the state of the on-board passenger. In this way, the off-board passenger can get information about a level of recognition of the hazardous situation by the on-board passenger in addition to information about the hazardous factor from the outward notification of the present embodiment. The examples of notification shown in FIGS. 14 and 15 to the off-board passenger may be combined with the examples of notification to the off-board passenger shown in FIGS. 8 and 9. For example, in addition to the text 44 and the real-time image 45, the real-time image 42 of the surrounding of the target vehicle V or the image 43 indicating the position of the hazardous factor relative to the target vehicle V may be displayed on the screen of the communication terminal 61.

C-2. Effects

The notification controller 103 of the third embodiment includes the recognition level judgment unit 14 that judges a level of recognition of a hazardous situation by the on-board passenger on the basis of at least any of a consciousness level and a direction of a line of sight of the on-board passenger, and a behavior by the on-board passenger. The notification control unit 13 judges whether to make outward notification and determines a substance of the outward notification in response to the recognition level. Thus, according to the notification controller 103, it is possible to make outward notification responsive to a recognition level in a manner such as making the outward notification only if a level of recognition of the hazardous situation by the on-board passenger is low.

D. Fourth Embodiment

D-1. Configuration

Figure 16:
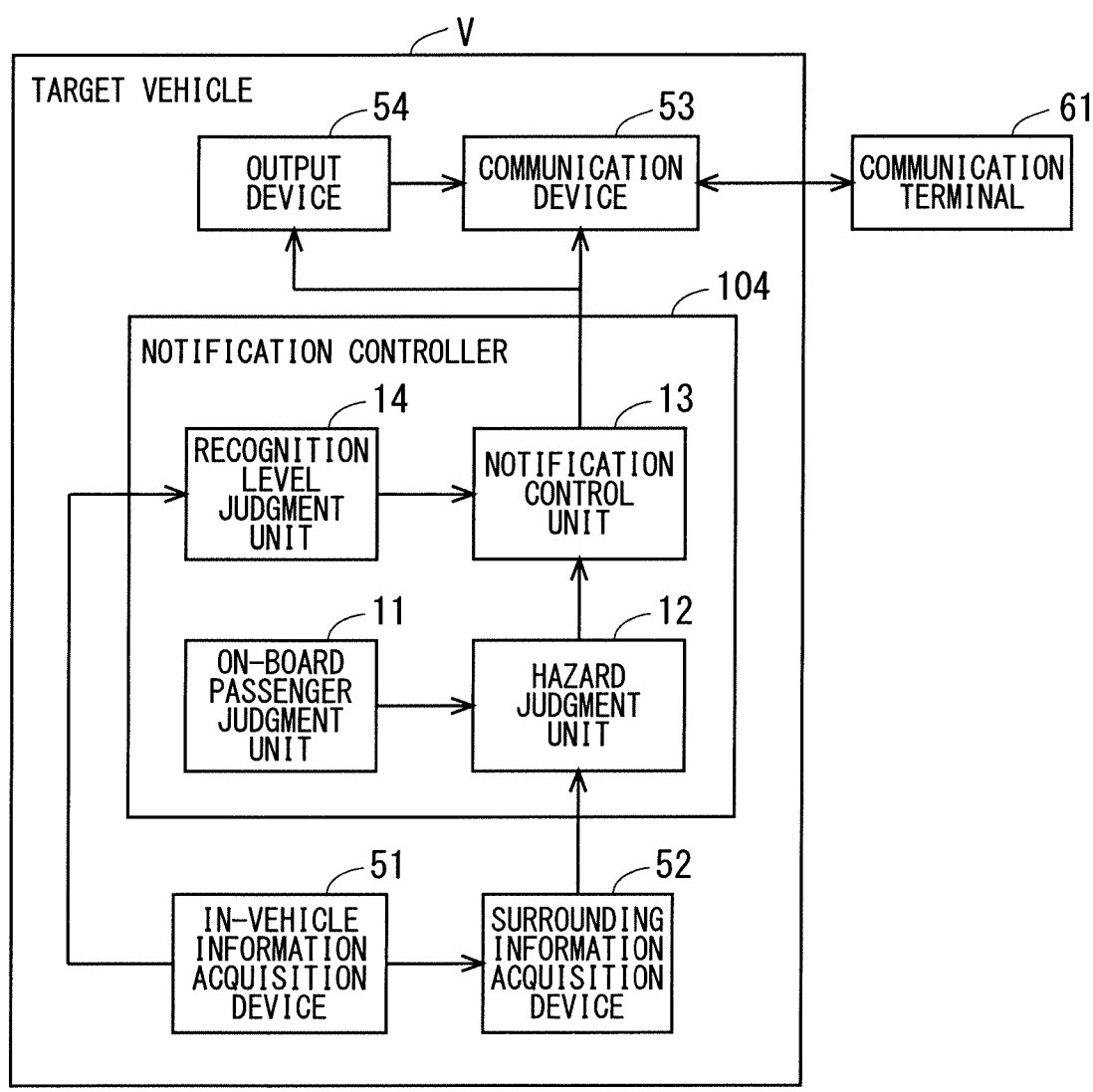
FIG. 16 is a block diagram showing the configuration of a notification controller according to a fourth embodiment.

FIG. 16 is a block diagram showing the configuration of a notification controller 104 according to a fourth embodiment. The notification controller 104 is connected to an output device 54 in addition to being connected to the in-vehicle information acquisition device 51, the surrounding information acquisition device 52, and the communication device 53 and is allowed to use these devices. The output device 54 is mounted on the target vehicle V and is used for notifying an on-board passenger of the occurrence of a hazardous situation. The notification to the on-board passenger is also called inward notification.

The inward notification is made in the form of any of display, voice, and vibration, or a combination thereof. If the inward notification is to be made in the form of display, the output device 54 includes a display device such as a liquid crystal display, an organic electro luminescence (EL) display, or a head-up display (HUD). If the inward notification is to be made in the form of voice, the output device 54 includes a speaker. If the inward notification is to be made in the form of vibration, the output device 54 includes a vibratory device provided at a seat of the target vehicle V.

If a hazardous situation occurs around the target vehicle V, the notification control unit 13 makes the inward notification in addition to outward notification in response to a hazardous level and a level of recognition by the on-board passenger.

D-2. Behavior

Figure 17:
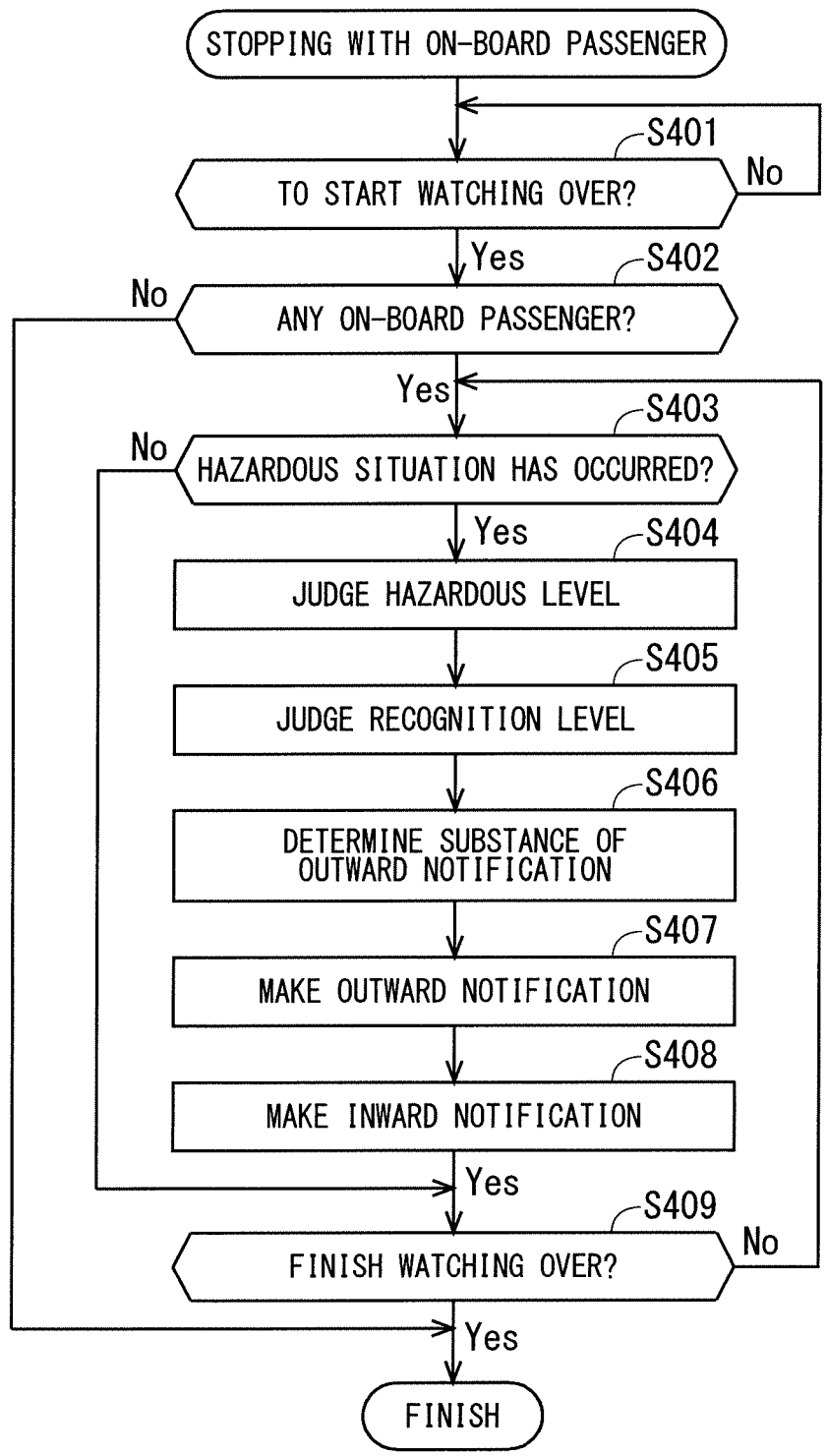
FIG. 17 is a flowchart showing the behavior of the notification controller according to the fourth embodiment.

FIG. 17 is a flowchart showing the behavior of the notification controller 104 according to the fourth embodiment. The behavior of the notification controller 104 will be described below in line with the flow in FIG. 17. Steps S401 to S407 in FIG. 17 are the same as steps S301 to S307 in FIG. 11 respectively, so that description of these steps will be omitted.

After the notification control unit 13 makes outward notification in step S407, the notification control unit 13 makes inward notification in step S408. Step S409 performed thereafter is the same as step S209 in FIG. 4.

Like the outward notification, the inward notification may be made on the basis of a hazardous level of a hazardous situation having occurred around the target vehicle V and a level of recognition of a hazardous factor by the on-board passenger. FIG. 18 illustrates styles of the outward notification and the styles of the inward notification responsive to the hazardous level and the recognition level. The styles of the outward notification are the same as those shown in FIG. 13.

In the example shown in FIG. 18, if a hazardous level is 1, inward notification is not made at any recognition level. If a hazardous level is 2, inward situation notification is made at a recognition level 1. If a hazardous level is 3, the inward situation notification is made at a recognition level equal to or less than 2. If a hazardous level is 4, the inward situation notification is made at a recognition level equal to or greater than 3 and inward warning notification is made at a recognition level equal to or less than 2. If a hazardous level is 5, the inward warning notification is made at any recognition level. Here, while both the inward situation notification and the inward warning notification are inward notifications, the inward warning notification means notification of higher recognizability than the inward situation notification.

As described above, the notification control unit 13 exerts control toward higher probability of making the inward notification in response to increase in a hazardous level and reduction in a recognition level.

After making the inward notification, the notification control unit 13 may judge whether the on-board passenger has recognized the hazard and make inward notification or outward notification again if the hazard is not recognized. The inward notification to be made for a second time may have a substance changed from that of the first inward notification.

Figure 19:
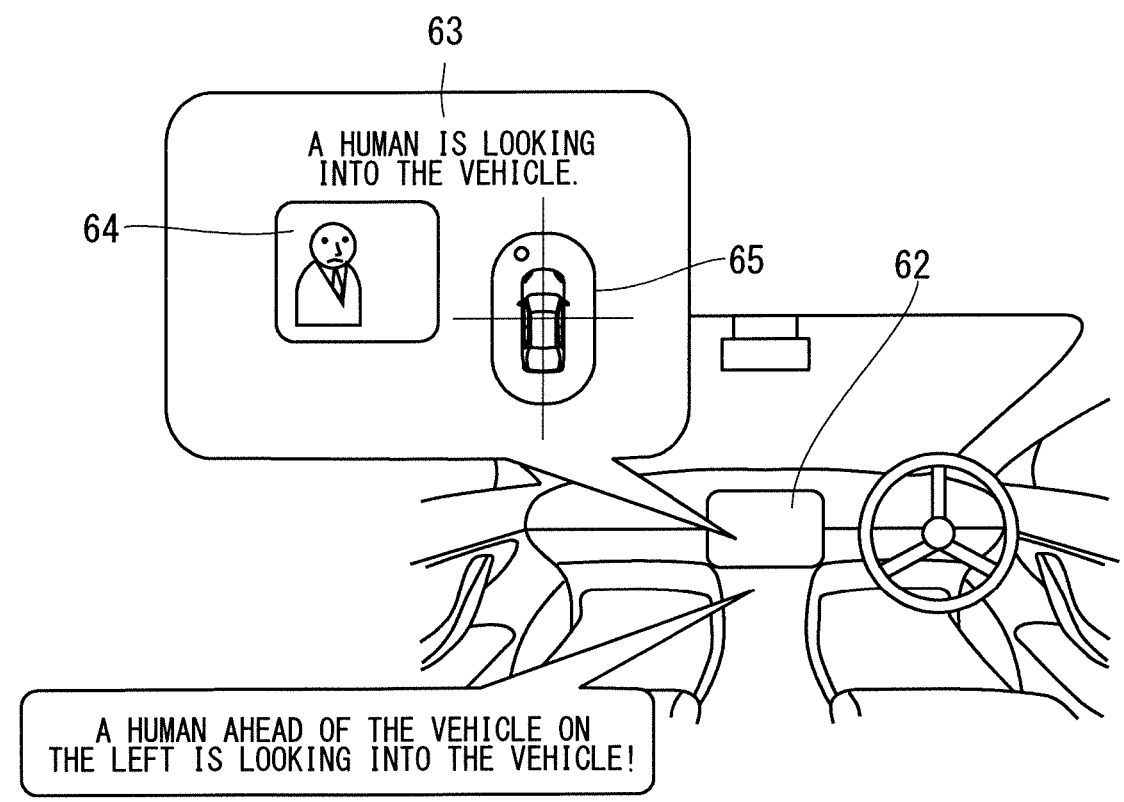
FIG. 19 shows an example of inward notification.
Figure 21:
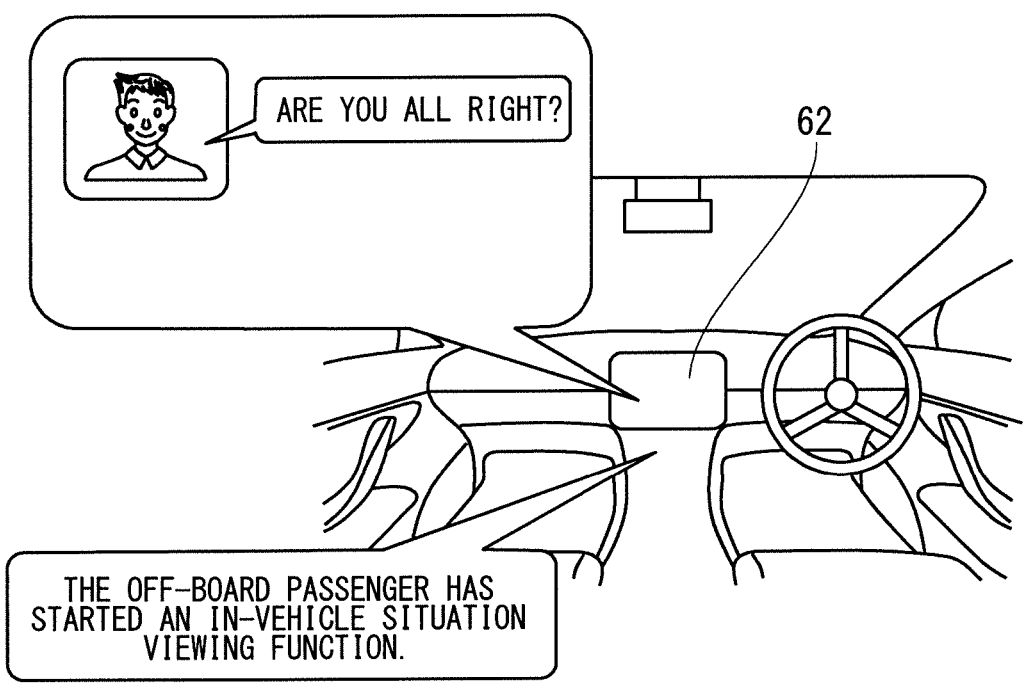
FIG. 21 shows an example of the inward notification.

FIGS. 19 to 21 each show an example of the inward notification. FIG. 19 shows an example of the inward notification using a display device 62 mounted in the target vehicle V. Text 63 showing that "A human is looking into the vehicle.", a real-time image 64 of the surrounding of the target vehicle V, and an image 65 indicating the position of a hazardous factor relative to the target vehicle V are displayed on a screen of the display device 62. The image 65 shows that the hazardous factor is ahead of the target vehicle V on the left. Simultaneously with the display on the display device 62, voice saying that "A human ahead of the vehicle on the left is looking into the vehicle!" may be output from a speaker mounted in the target vehicle V, for example.

FIG. 20 shows an example of inward notification using a portable terminal 66 of the on-board passenger. Text 63, a real-time image 64, and an image 65 same as those displayed on the display device 62 in FIG. 19 are displayed on a screen of the portable terminal 66.

D-3. Modifications

If the off-board passenger performs predetermined operation on the communication terminal 61, a state of the on-board passenger acquired by the in-vehicle information acquisition device 51 may be transmitted from the notification control unit 13 to the communication terminal 61 through the communication device 53. In this case, the real-time image 45 of the on-board passenger shown in FIG. 15 may be transmitted to the communication terminal 61, for example. This allows the off-board passenger to monitor the state of the on-board passenger successively in response to the own operation.

If the off-board passenger monitors the state of the on-board passenger successively, the on-board passenger may be given notification indicating that the off-board passenger is viewing a situation in the vehicle through the communication terminal 61 in order to prevent giving an impression of being imaged in secret to the on-board passenger. As shown in FIG. 21, for example, voice saying that "The off-board passenger has started an in-vehicle situation viewing function." is output from a speaker mounted in the target vehicle V, and then an image, an avatar, or an icon of the off-board passenger is displayed on the screen of the display device 62 mounted in the target vehicle V. By doing so, anxiety about privacy of the on-board passenger is relieved.

In the explanation given above, the notification controller 104 makes inward notification automatically. Alternatively, after the off-board passenger receives outward notification from the notification controller 104, the inward notification may be made by a method of calling on the on-board passenger directly. Specifically, the notification control unit 13 acquires voice spoken by the off-board passenger through the communication terminal 61 and the communication device 53, and the spoken voice is output from a speaker mounted on the target vehicle V corresponding to the output device 54. By doing so, the inward notification is realized through the voice of the off-board passenger. In this case, in addition to the voice of the off-board passenger, an image, an avatar, or an icon of the off-board passenger such as that shown in FIG. 21 may be displayed on the screen of the display device 62.

If the inward notification is realized through the voice spoken from the off-board passenger to the on-board passenger, voice spoken from the on-board passenger to the off-board passenger may be transmitted through radio communication between the communication device 53 and the communication terminal 61. By doing so, it becomes possible for the off-board passenger and the on-board passenger to talk to each other. In this case, synchronization may be formed between the screen of the communication terminal 61 and the screen of the display device 62 mounted in the target vehicle V. As an example, the display content of the outward notification or that of the inward notification described above is displayed on both the communication device 53 and the communication terminal 61 simultaneously. In this case, both the off-board passenger and the on-board passenger may be allowed to operate the screens for selecting a display content or for zooming-in. This allows the off-board passenger and the on-board passenger to communicate with each other in real time while the off-board passenger and the on-board passenger share understanding to which degree the counterpart grasps a situation on the other side. By grasping to which degree the on-board passenger is aware of a hazardous factor around the target vehicle V, it becomes possible for the off-board passenger to make correct judgment and communicate with the on-board passenger properly.

The outward notification to the off-board passenger and the inward notification to the on-board passenger have been described above. The notification controller 104 may notify a third party other than the off-board passenger and the on-board passenger of a hazardous situation occurring around the target vehicle V. This notification to the third party is also called third party notification. Here, the third party to receive the notification is determined in advance. If the target vehicle V is a commercial service vehicle, a service provider or a security service provider is assumed as the third party.

The function of making outward notification and inward notification by the notification controller 104 may be switched off in response to input operation on the notification controller 104 by the on-board passenger using an input device not shown in FIG. 16. Specifically, even if the hazard judgment unit 12 judges that a hazardous situation is occurring, the notification control unit 13 does not make outward notification if operational input indicating that outward notification is not to be made is received from the on-board passenger. For example, if a human approaching the target vehicle V is a police officer or an acquaintance of the on-board passenger and the on-board passenger makes own confirmation that the surrounding of the target vehicle V is safe, the above-described function is switched off. By doing so, it becomes possible to prevent making outward notification or inward notification wastefully. Notification indicating that the on-board passenger has confirmed the safety of the surrounding may be given to the off-board passenger.

The notification controller 104 itself may perform the process of switching off the function of making outward notification and inward notification by the notification controller 104 by detecting a situation and making judgment automatically without depending on the input operation by the on-board passenger described above. If the function of making outward notification and inward notification is switched off automatically, the notification controller 104 may notify the switching off to the on-board passenger and the off-board passenger.

If the notification controller 104 detects a hazardous situation around the target vehicle V after the function of making outward notification is switched off in response to safety confirmation by the on-board passenger, the function of making outward notification and inward notification is switched on automatically.

By using the communication terminal 61, the off-board passenger may check information about the occurrence of outward notification and inward notification or history information such as about operation of switching off the function of making outward notification and inward notification by the on-board passenger.

D-4. Effects

In the notification controller 104 of the fourth embodiment, if the hazard judgment unit 12 judges that a hazardous situation is occurring, the notification control unit 13 makes inward notification that is notification indicating the occurrence of the hazardous situation to the on-board passenger on the basis of a recognition level and using the output device 54 mounted on the target vehicle V. Thus, according to the notification controller 104, it is possible to make the on-board passenger aware of the hazardous situation occurring around the target vehicle V.

E. Fifth Embodiment

E-1. Configuration

Figure 22:
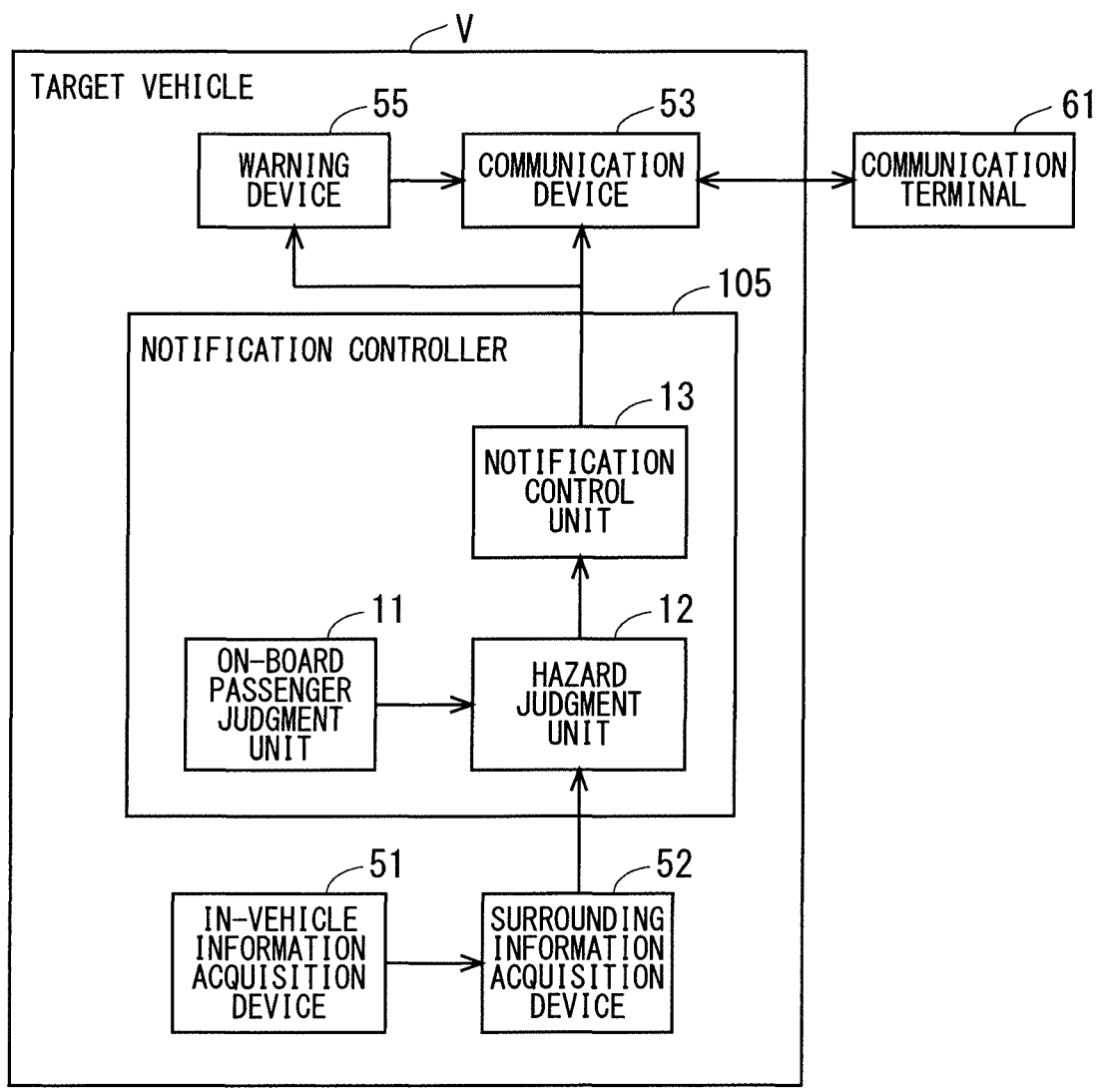
FIG. 22 is a block diagram showing the configuration of a notification controller according to a fifth embodiment.

FIG. 22 is a block diagram showing the configuration of a notification controller 105 according to a fifth embodiment. The notification controller 105 is connected to a warning device 55 in addition to being connected to the in-vehicle information acquisition device 51, the surrounding information acquisition device 52, and the communication device 53 and is allowed to use these devices. The configuration of the notification controller 105 is the same as that of the notification controller 101 of the first embodiment.

The warning device 55 is mounted on the target vehicle V and issues warning against a hazardous factor existing around the target vehicle V under control by the notification control unit 13. The warning issued by the warning device 55 is also called surrounding warning. The warning device 55 includes an LED lamp, a horn, a headlight, a turn signal, or a speaker, for example.

E-2. Behavior

Figure 23:
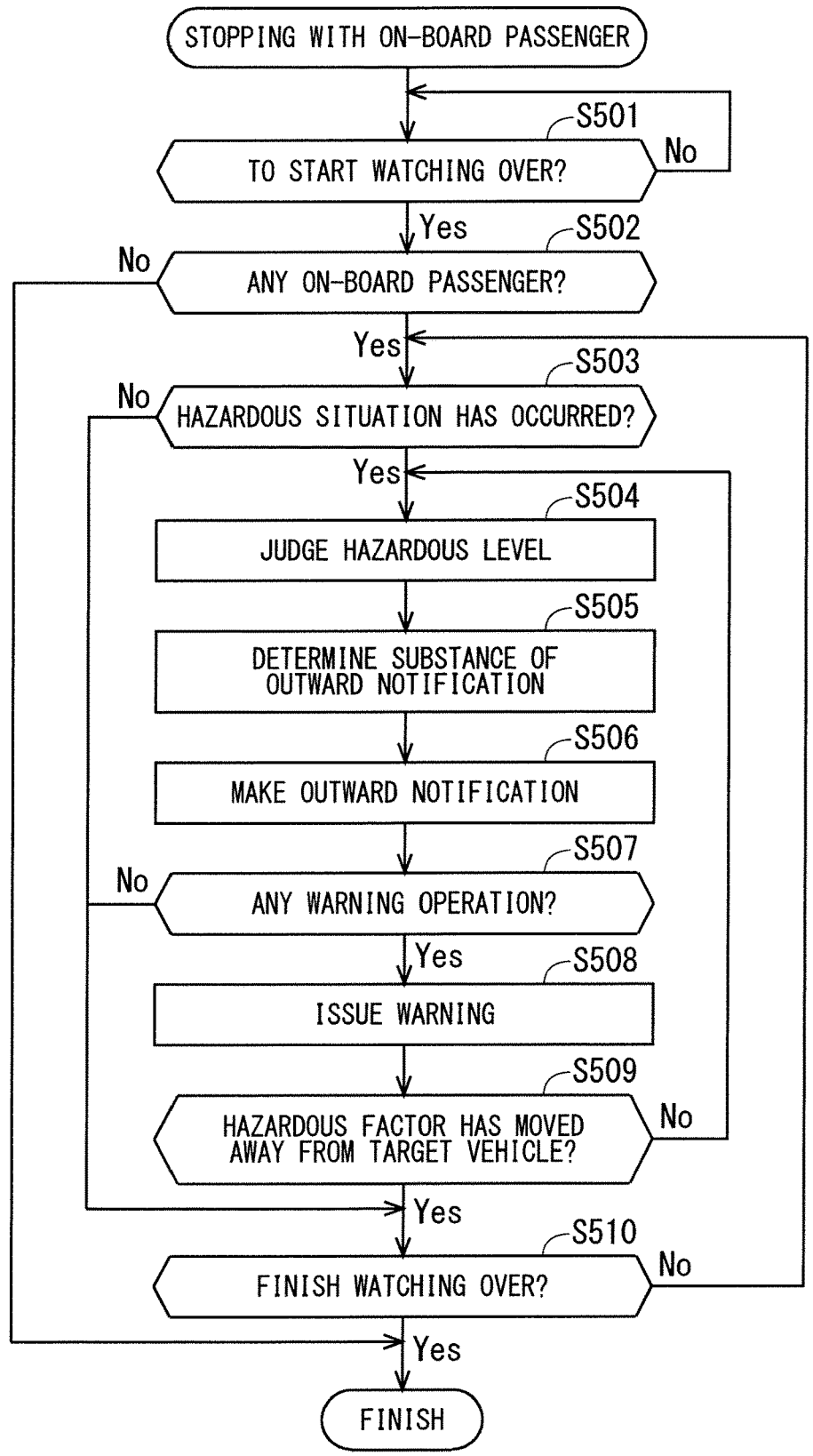
FIG. 23 is a flowchart showing the behavior of the notification controller according to the fifth embodiment.

FIG. 23 is a flowchart showing the behavior of the notification controller 105 according to the fifth embodiment. The behavior of the notification controller 105 will be described below in line with the flow in FIG. 23. Steps S501 to S506 are the same as steps S201 to S206 in FIG. 4 respectively, so that description of these steps will be omitted.

After the notification control unit 13 makes outward notification in step S506, the notification control unit 13 judges the presence of warning operation by an off-board passenger in step S507.

If the notification control unit 13 judges in step S507 that there is no warning operation by the off-board passenger, the flow proceeds to a process ins step S510. If the notification control unit 13 judges in step S507 that there is warning operation by the off-board passenger, the notification control unit 13 issues surrounding warning against a hazardous factor using the warning device 55 in step S508.

After step S508, the notification control unit 13 judges in step S509 whether the hazardous factor has moved away from the target vehicle V on the basis of surrounding information acquired from the surrounding information acquisition device 52. The notification control unit 13 judges that the hazardous factor has moved away from the target vehicle V if a distance between the hazardous factor and the target vehicle V becomes equal to or greater than a predetermined distance.

If the notification control unit 13 judges in step S509 that the hazardous factor has not moved away from the target vehicle V, the process by the notification controller 105 returns to step S504.

If the notification control unit 13 judges in step S509 that the hazardous factor has moved away from the target vehicle V, the process by the notification controller 105 proceeds to step S510. The process in step S510 is the same as that in step S209 in FIG. 4.

Figure 24:
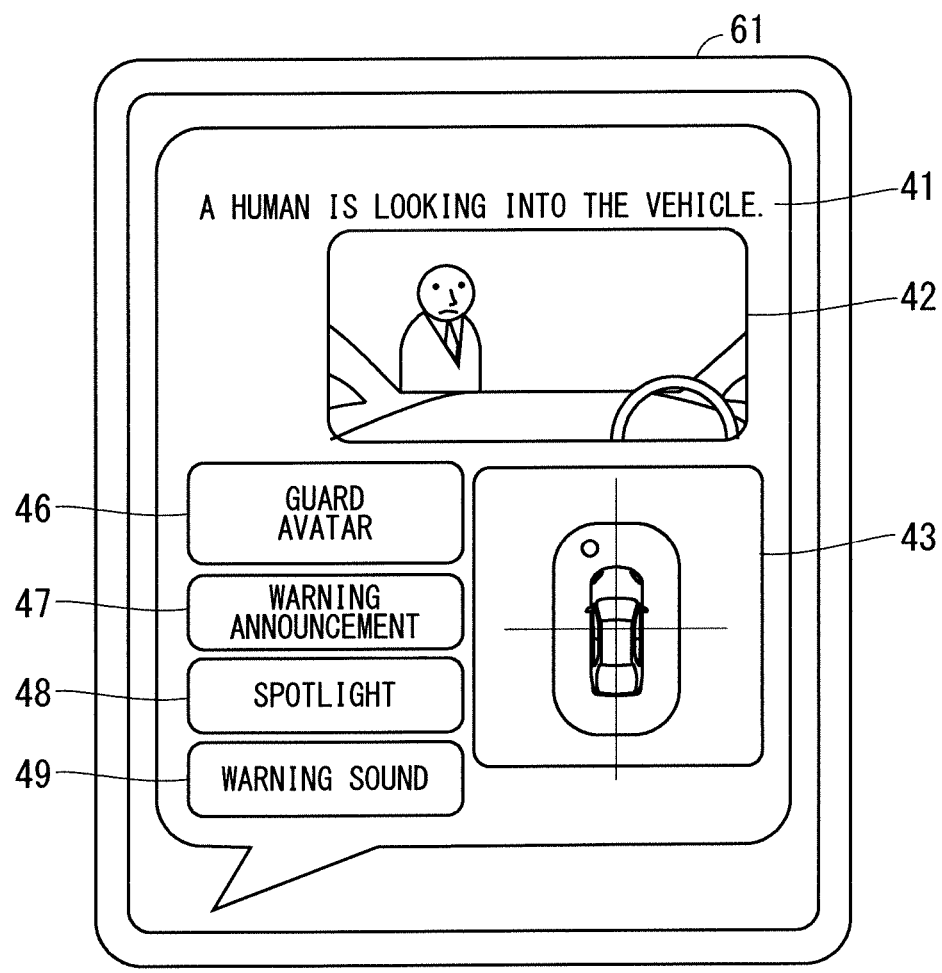
FIG. 24 shows an example of warning operation by an off-board passenger.

Warning operation by the off-board passenger will be described next. FIG. 24 shows a display screen on the communication terminal 61 having received outward notification. Text 41 about a hazardous factor such as "A human is looking into the vehicle.", a real-time image 42 of the hazardous factor, and an image 43 indicating the position of the hazardous factor relative to the target vehicle V such as those shown in FIG. 9 are displayed on the communication terminal 61.

Furthermore, buttons 46 to 49 for input of the warning operation to the notification controller 105 are displayed on the communication terminal 61. The button 46 is a button for commanding display of a guard avatar. The button 47 is a button for commanding output of warning announcement. The button 48 is a button for commanding emission of spotlight. The button 49 is a button for commanding output of warning sound.

If the off-board passenger selects the button 46, for example, a command to display a guard avatar is transmitted from the communication terminal 61 to the communication device 53. The notification control unit 13 acquires this command from the communication device 53 and recognizes that warning operation has been performed by the off-board passenger. Then, the notification control unit 13 causes the warning device 55 to display a guard avatar. In this way, the notification control unit 13 issues surrounding warning in response to operational input to the communication terminal 61 of the off-board passenger as a trigger.

Figure 25:
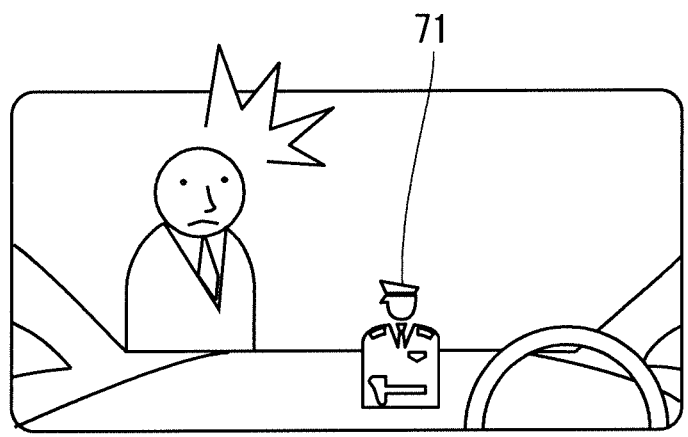
FIG. 25 shows an example of warning against a hazardous factor.

FIG. 25 shows an example of warning of displaying a guard avatar 71 against a human as a hazardous factor. Here, the warning device 55 is an HUD that projects an image onto a dashboard of the target vehicle V, for example. The warning device 55 may be a liquid crystal display device mounted on a window of the target vehicle V, for example, and may be configured to present appropriate display toward the outside of the target vehicle V. The warning device 55 may also be a projection device that projects an image on a window of the target vehicle V. Presenting the guard avatar 71 to the human as the hazardous factor is expected to fulfill the effect of making the human hesitate to do action such as harmful action on the target vehicle V.

Desirably, the guard avatar 71 is displayed toward a direction in which the hazardous factor is present as viewed from the target vehicle V in consideration of the position of the target vehicle V and that of the hazardous factor relative to each other. FIG. 25 shows an example of such display. For the purpose of making the human ahead of the target vehicle V on the left aware of the guard avatar 71, the guard avatar 71 is displayed on the dashboard of the target vehicle V, specifically, on the front side of the target vehicle V. This increases warning effect. The notification control unit 13 grasps the position of the target vehicle V and that of the hazardous factor relative to each other on the basis of surrounding information acquired from the surrounding information acquisition device 52, and issues surrounding warning toward the direction in which the hazardous factor is present.

Figure 26:
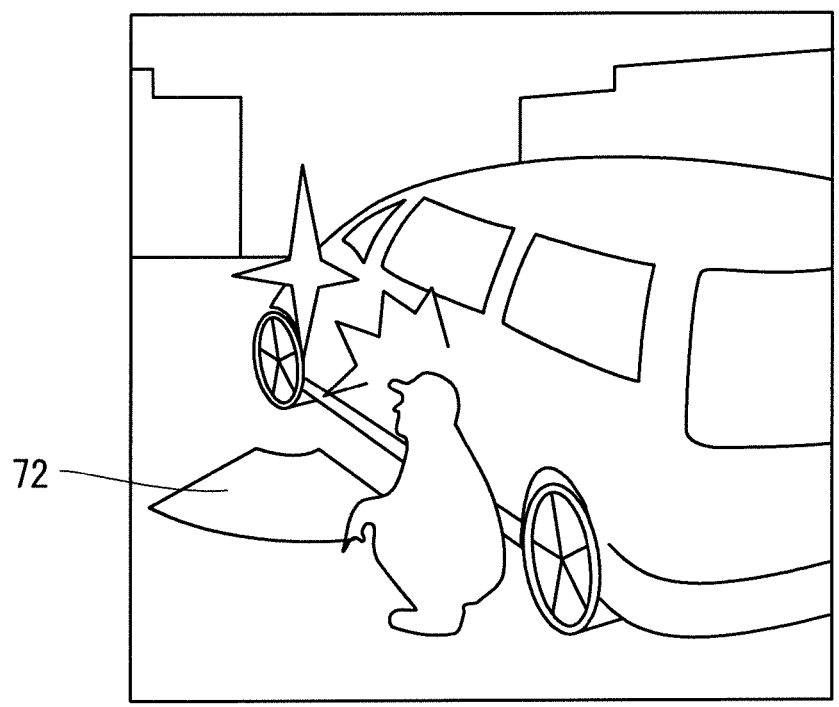
FIG. 26 shows an example of the warning against the hazardous factor.

FIG. 26 shows an example of warning of emitting spotlight 72 toward a human as a hazardous factor. Here, the warning device 55 is an irradiator that emits the spotlight 72 from the target vehicle V toward an arbitrary direction. As described above, the notification control unit 13 issues surrounding warning by outputting any of an image, voice, and spotlight toward a direction of a factor of a hazardous situation.

As shown in FIG. 24, the several buttons 46 to 49 for commanding waning of different substances are displayed on the communication terminal 61. The off-board passenger can give warning of a desired substance out of several options by selecting a desired button from the buttons 46 to 49. This allows the off-board passenger to select warning suitable for a hazardous situation around the target vehicle V grasped from outward notification. If a hazardous level is relatively low such as in a situation where a passerby is passing near the target vehicle V, for example, the off-board passenger may select warning not to be recognized with high recognizability from the surrounding such as displaying of a guard avatar or flashing of an LED lamp. On the other hand, if a hazardous level is high such as in a situation where a passerby having a hazardous item is looking into the target vehicle V, warning to be recognized with higher recognizability from the surrounding, which may be issuing of warning sound such as buzzer sound, beeping of a horn, or turning-on of a headlight and a turn signal, may be selected in addition to the warning operation described above. In this way, it is possible to change a substance of surrounding warning in response to a hazardous level.

In the explanation given above, whether to issue warning against a hazardous factor and a substance of the warning are determined by selecting operation by the off-board passenger. Alternatively, the notification control unit 13 may make these determinations automatically on the basis of the type of a hazardous factor or a hazardous level of a hazardous situation. If the notification control unit 13 automatically judges that warning is to be issued, the notification control unit 13 may cause the communication terminal 61 to display a confirmation message such as "Warning will be issued. Is it acceptable?" and may issue surrounding warning after receipt of confirming operation by the off-board passenger.

In the case described in the fourth embodiment, notification indicating that a hazardous situation is occurring is made to a third party such as a service provider. Such notification to a third party is applicable to the present embodiment. For example, the notification control unit 13 issues warning of a substance such as "The vehicle and the surrounding are being watched. Any trouble will be reported to a security company." by means of display or voice as surrounding warning against a hazardous factor. If a hazardous level of a hazardous situation does not decrease thereafter, the notification control unit 13 may make notification indicating that the hazardous situation is occurring to a third party such as a security service provider.

E-3. Effects

In the notification controller 105 of the fifth embodiment, if the hazard judgment unit 12 judges that a hazardous situation is occurring, the notification control unit 13 issues surrounding warning that is warning to the surrounding of the target vehicle V using the warning device 55 mounted on the target vehicle V. Thus, the notification controller 105 is expected to fulfill the effect of distancing a hazardous factor from the target vehicle V if the hazardous factor is a human, a non-target vehicle, or an animal, for example.

F. Sixth Embodiment

F-1. Configuration

Figure 27:
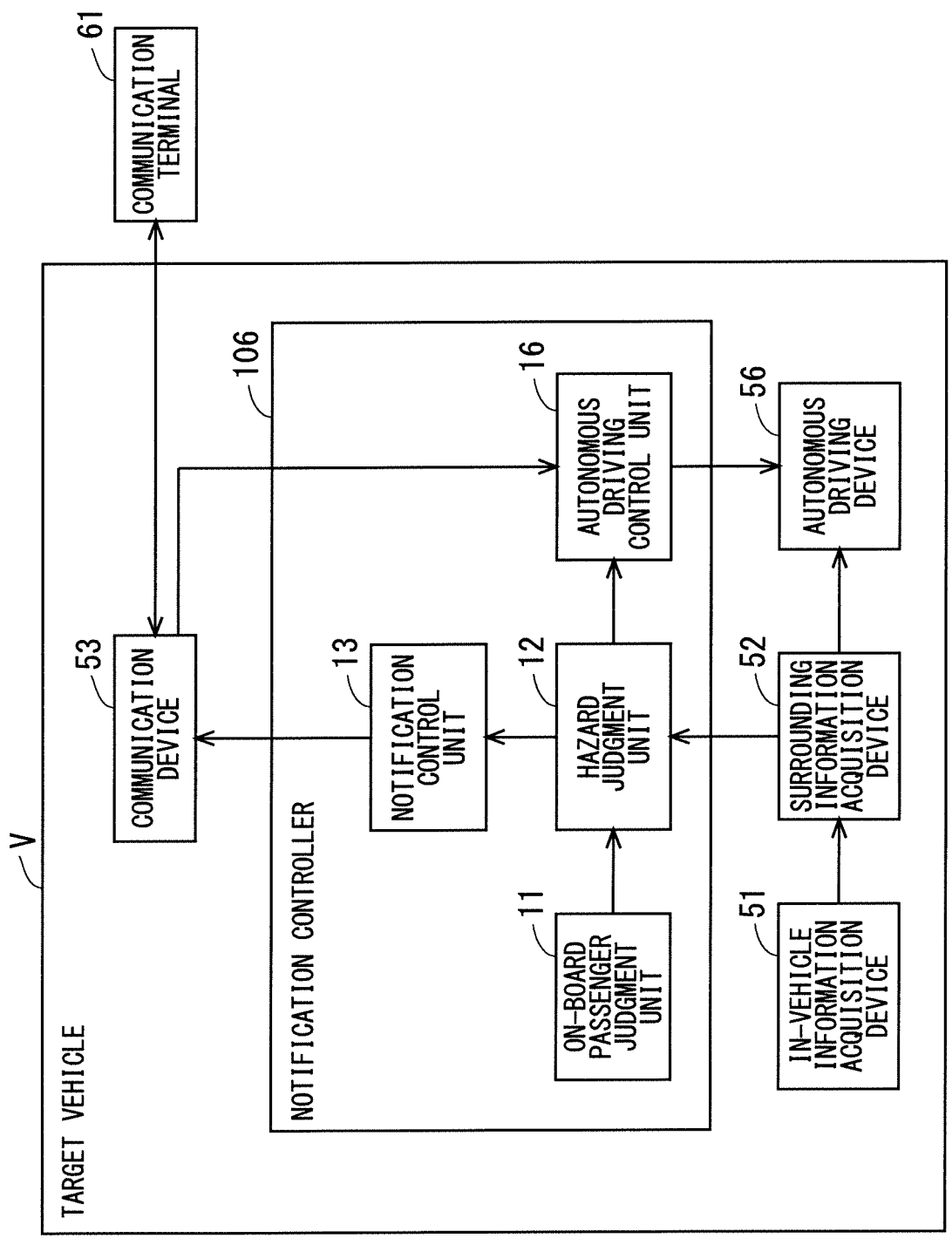
FIG. 27 is a block diagram showing the configuration of a notification controller according to a sixth embodiment.

FIG. 27 is a block diagram showing the configuration of a notification controller 106 according to a sixth embodiment. The notification controller 106 includes an autonomous driving control unit 16 in addition to the configuration of the notification controller 102 of the second embodiment. The notification controller 106 is connected to an autonomous driving device 56 in addition to being connected to the in-vehicle information acquisition device 51, the surrounding information acquisition device 52, and the communication device 53 and is allowed to use these devices.

The autonomous driving device 56 is mounted on the target vehicle V and makes autonomous driving of the target vehicle V.

The autonomous driving control unit 16 commands the autonomous driving device 56 to cause the target vehicle V to travel in a direction of getting away from a hazardous factor or in a direction of getting closer to the hazardous factor and driving the hazardous factor away in response to a hazardous level of a hazardous situation or the type of the hazardous factor.

F-2. Behavior

Figure 28:
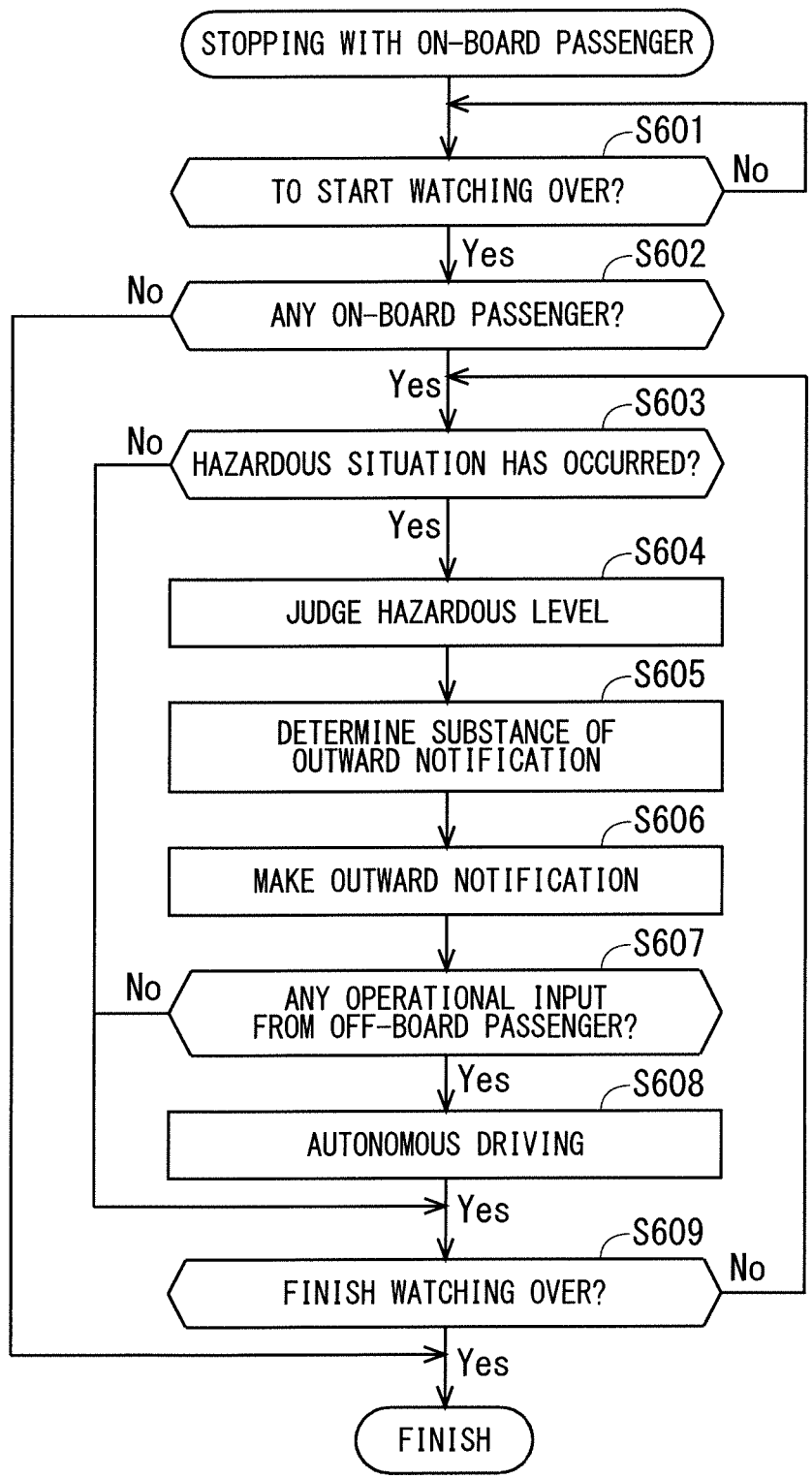
FIG. 28 is a flowchart showing the behavior of the notification controller according to the sixth embodiment.

FIG. 28 is a flowchart showing the behavior of the notification controller 106 according to the sixth embodiment. Steps S601 to S606 in FIG. 28 are the same as steps S201 to S206 in FIG. 4 respectively, so that description of these steps will be omitted.

After the notification control unit 13 makes outward notification in step S606, the autonomous driving control unit 16 judges in step S607 whether input for autonomous driving operation has been received from an off-board passenger.

If there is no input for autonomous driving operation from the off-board passenger in step S607, the process by the notification controller 106 proceeds to step S609. If the autonomous driving control unit 16 judges in step S607 that operation for autonomous driving has been performed by the off-board passenger, the autonomous driving control unit 16 commands the autonomous driving device 56 to make autonomous driving in step S608.

Then, the process by the notification controller 106 proceeds to step S609. The process in step S609 is the same as that in step S209 in FIG. 4.

If the communication terminal 61 receives the outward notification from the notification controller 106, the communication terminal 61 displays information about a hazardous factor or about a level of recognition by an on-board passenger, and also displays an operation button for autonomous driving, for example. In response to selection of the operation button for autonomous driving by the off-board passenger, input information about autonomous driving operation is transmitted from the communication terminal 61 to the communication device 53.

The off-board passenger may remotely control traveling of the target vehicle V using the communication terminal 61.

Instead of controlling autonomous driving of the target vehicle V, the autonomous driving control unit 16 may control a self-propelled robot or an unmanned aerial vehicle (UAV) equipped at the target vehicle V. Specifically, the autonomous driving control unit 16 causes the self-propelled robot or the UAV to make behavior of driving a hazardous factor away or threatening action on the hazardous factor.

In the explanation given above, the autonomous driving control unit 16 commands the autonomous driving device 56 to make autonomous driving in response to receipt of the operation for autonomous driving by the off-board passenger. Alternatively, the autonomous driving control unit 16 may perform operation for autonomous driving in response to operation by the on-board passenger or on the basis of its own judgment.

<F-3. Effects

In the notification controller 106 of the sixth embodiment, the target vehicle V is configured to drive autonomously using the autonomous driving device 56. The notification controller 106 includes the autonomous driving control unit 16 that causes the autonomous driving device 56 to move the target vehicle V if the hazard judgment unit 12 judges that a hazardous situation is occurring. Thus, according to the notification controller 106, if the hazardous situation is occurring around the target vehicle V, it is possible for the target vehicle V to get away from a hazardous factor or drive the hazardous factor away by causing the target vehicle V to drive autonomously.

H. Hardware Configuration

Figure 29:
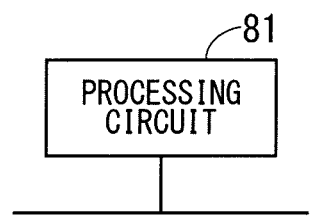
FIG. 29 shows a hardware configuration of the notification controller.

The on-board passenger judgment unit 11, the hazard judgment unit 12, the notification control unit 13, the recognition level judgment unit 14, and the autonomous driving control unit 16 in the notification controllers 101 to 106 described above are realized by a processing circuit 81 shown in FIG. 29. Specifically, the processing circuit 81 includes the on-board passenger judgment unit 11, the hazard judgment unit 12, the notification control unit 13, the recognition level judgment unit 14, and the autonomous driving control unit 16 (hereinafter called the "units including the on-board passenger judgment unit 11"). The processing circuit 81 may be dedicated hardware, or may be a processor to execute a program stored in a memory. The processor may be a central processing unit, a processing device, an arithmetic device, a microprocessor, a microcomputer, or a digital signal processor (DSP), for example.

If the processing circuit 81 is dedicated hardware, the processing circuit 81 corresponds to a single circuit, a complex circuit, a programmed processor, a parallel-programmed processor, an application specific integrated circuit (ASIC), a field-programmable gate array (FPGA), or a combination thereof, for example. The respective functions of units such as those of the units including the on-board passenger judgment unit 11 may be realized by a plurality of the processing circuits 81. Alternatively, the functions of all the units may be realized together in one processing circuit.

Figure 30:
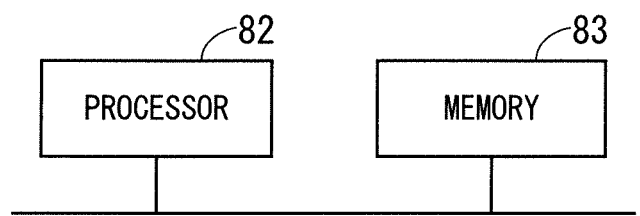
FIG. 30 shows a hardware configuration of the notification controller.

If the processing circuit 81 is a processor, the functions of the units including the on-board passenger judgment unit 11 are realized by combination with a kind of software (software, firmware, or software and firmware). Such a kind of software is described as a program and stored into a memory. As shown in FIG. 30, a processor 82 applied to the processing circuit 81 reads a program stored in a memory 83 and executes the read program, thereby realizing the function of each unit. Specifically, each of the notification controllers 101 to 106 includes the memory 83 for storing the program that eventually results in implementations of steps when the program is executed by the processing circuit 81, and these steps include: if at least one passenger of two or more passengers in the target vehicle V gets out of the vehicle to become an off-board passenger, judging whether there is a different passenger staying in the target vehicle V; judging whether a hazardous situation is occurring around the target vehicle V if there is an on-board passenger who is the different passenger staying in the target vehicle V; and making radio communication with the communication terminal 61 of the off-board passenger to make outward notification that is notification indicating the occurrence of the hazardous situation to the off-board passenger if the occurrence of the hazardous situation is determined. In other words, this program can also be said to be a program for causing a computer to implement the procedures or methods of the units including the on-board passenger judgment unit 11. Here, the memory 83 can be a nonvolatile or volatile semiconductor memory such as a random access memory (RAM), a read only memory (ROM), a flash memory, an erasable programmable read only memory (EPROM) or an electrically erasable programmable read only memory (EEPROM), a hard disk drive (HDD), a magnetic disk, a flexible disk, an optical disk, a compact disk, a minidisk, a digital versatile disc (DVD), drivers thereof, or any type of storage medium to be used in the future, for example.

In the configuration described above, the respective functions of the units including the on-board passenger judgment unit 11 are realized by one of hardware and a kind of software. However, this is not the limited configuration. In one configuration, some of the units including the on-board passenger judgment unit 11 may be realized by dedicated hardware and a different one of the units may be realized by a kind of software. For example, the function of the on-board passenger judgment unit 11 may be realized by a processing circuit as dedicated hardware, and the functions of the other units may be realized by causing the processing circuit 81 as the processor 82 to read the program stored in the memory 83 and to execute the read program.

As described above, the processing circuit is available for realizing each of the above-described functions using hardware, a kind of software, or a combination thereof.

While the notification controllers 101 to 106 have been described above as vehicle-mounted devices, these devices are also applicable to a system constructed as a system by combining a portable navigation device (PND), a communication terminal (a portable terminal such as a portable phone, a smartphone, or a tablet), application functions installed on these devices, and a server appropriately. In this case, all the functions or all the constituting elements of the notification controllers 101 to 106 described above may be arranged in a distributed manner in each device forming the system or may be arranged in a concentrated manner in any of the devices.

Figure 31:
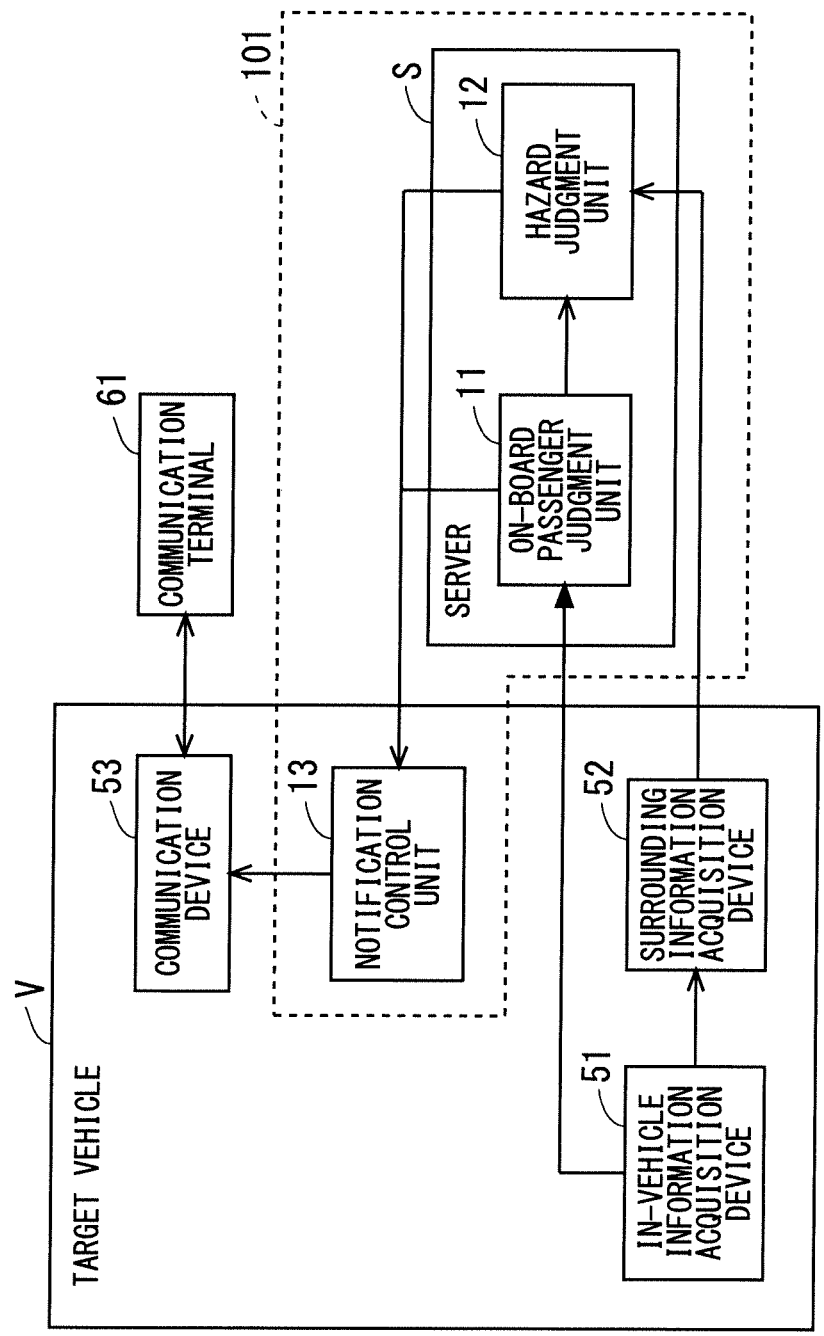
FIG. 31 shows an exemplary configuration of the notification controller configured using a target vehicle and a server.

FIG. 31 shows an exemplary configuration of the notification controller 101 configured using the target vehicle V and a server S. In the example shown in FIG. 31, of the units forming the notification controller 101, the on-board passenger judgment unit 11 and the hazard judgment unit 12 are arranged at the server S and notification control unit 13 is arranged at the target vehicle V.

The embodiments can be combined freely or each of the embodiments can be modified or omitted, if appropriate. The foregoing description is in all aspects illustrative and not restrictive. It is therefore understood that numerous modifications not shown can be devised.

EXPLANATION OF REFERENCE SIGNS

11 On-board passenger judgment unit
12 Hazard judgment unit
13 Notification control unit
14 Recognition level judgment unit
16 Autonomous driving control unit
51 In-vehicle information acquisition device
52 Surrounding information acquisition device
53 Communication device
54 Output device
55 Warning device
56 Autonomous driving device
61 Communication terminal
62 Display device
66 Portable terminal
101 to 106 Notification controller
V Target vehicle

The invention claimed is:
1. A notification controller comprising:
a processor to execute a program; and
a memory to store the program which, when executed by the processor, performs processes of,
   if at least one passenger of two or more passengers in a target vehicle gets out of the vehicle to become an off-board passenger, judging whether there is a different passenger staying in the target vehicle;
judging whether a hazardous situation is occurring around the target vehicle if there is an on-board passenger who is the different passenger staying in the target vehicle; and
in response to a judging that the hazardous situation is occurring, determining whether to make a radio communication with a communication terminal of the off board passenger based on judgement related to the different passenger, the judgement being based on at least one of an operational input received from the different passenger, and a level of recognition of the hazardous situation by the on-board passenger on the basis of at least any of a consciousness level and a direction of a line of sight of the on-board passenger, and a behavior by the on-board passenger; and
making the radio communication with the communication terminal of the off-board passenger to make outward notification that is notification indicating the occur- rence of the hazardous situation to the off-board passenger based on the determining whether to make the radio communication.

2. The notification controller according to claim 1, wherein
if it is judged that the hazardous situation is occurring, a hazardous level indicating a level of the hazardous situation is judged, and
it is judged whether to make the outward notification and a substance of the outward notification is determined in response to the hazardous level.

3. The notification controller according to claim 1, wherein
the hazardous level is judged on the basis of a distance between a factor of the hazardous situation and the target vehicle.

4. The notification controller according to claim 1, wherein
if a factor of the hazardous situation is a human existing around the target vehicle, the hazardous level is judged on the basis of at least any of a behavior by the human, a line of sight of the human, and a belonging to the human.

5. The notification controller according to claim 1, wherein
if a factor of the hazardous situation is a non-target vehicle existing around the target vehicle, the hazardous level is judged on the basis of at least one of a line of sight of a human in the non-target vehicle and a radio wave signal received from the non-target vehicle.

6. The notification controller according to claim 1, wherein
if a factor of the hazardous situation is an animal existing around the target vehicle, the hazardous level is judged on the basis of the type of the animal.

7. The notification controller according to claim 1, wherein
the outward notification is made again if feedback information indicating that the outward notification made previously has been checked is not received from the communication terminal of the off-board passenger.

8. The notification controller according to claim 7, wherein
a substance of the outward notification includes a frequency of the outward notification.

9. The notification controller according to claim 1, wherein
judged is the level of recognition of the hazardous situation by the on-board passenger on the basis of at least any of the consciousness level and the direction of a line of sight of the on-board passenger, and the behavior by the on-board passenger, and
it is judged whether to make the outward notification and a substance of the outward notification is determined in response to the recognition level.

10. The notification controller according to claim 9, wherein
if it is judged that the hazardous situation is occurring, an inward notification is made that is a notification indicating the occurrence of the hazardous situation to the on-board passenger on the basis of the recognition level using an output device mounted on the target vehicle.

11. The notification controller according to claim 10, wherein
the inward notification is made through voice spoken by the off-board passenger.

12. The notification controller according to claim 2, wherein
if it is judged that the hazardous situation is occurring, a surrounding warning is issued that is a warning to the surrounding of the target vehicle using a warning device mounted on the target vehicle.

13. The notification controller according to claim 12, wherein
the surrounding warning is issued in response to operational input to the communication terminal of the off-board passenger as a trigger.

14. The notification controller according to claim 12, wherein
a substance of the surrounding warning is changed in response to the hazardous level.

15. The notification controller according to claim 12, wherein
the surrounding warning is issued by outputting any of an image, voice, and spotlight toward a direction of a factor of the hazardous situation.

16. The notification controller according to claim 1, wherein
a third party notification is made that is a notification indicating the occurrence of the hazardous situation to a predetermined third party other than the off-board passenger and the on-board passenger by radio communication with a communication device of the third party.

17. The notification controller according to claim 1, wherein
even if it is judged that the hazardous situation is occurring, the outward notification is not made if the operational input indicating that the outward notification is not to be made is received from the on-board passenger.

18. The notification controller according to claim 1, wherein
the target vehicle is configured to drive autonomously using a autonomous driving device,
the autonomous driving device is made to move the target vehicle if it is judged that the hazardous situation is occurring.

19. A notification control method comprising:
if at least one passenger of two or more passengers in a target vehicle gets out of the vehicle to become an off-board passenger, judging whether there is a different passenger staying in the target vehicle;
judging whether a hazardous situation is occurring around the target vehicle if there is an on-board passenger who is the different passenger staying in the target vehicle;
in response to judging that the hazardous situation is occurring, determining whether to make a radio communication with a communication terminal of the off board passenger based on judgement related to the different passenger, the judgement being based on at least one of an operational input received from the different passenger, and a level of recognition of the hazardous situation by the on-board passenger on the basis of at least any of a consciousness level and a direction of a line of sight of the on-board passenger, and a behavior by the on-board passenger; and
making the radio communication with the communication terminal of the off-board passenger to make outward notification that is notification indicating the occurrence of the hazardous situation to the off-board passenger based on the determining whether to make the radio communication.

* * * * *